United States Patent
Mahmoud et al.

(10) Patent No.: US 11,836,971 B2
(45) Date of Patent: Dec. 5, 2023

(54) METHOD AND DEVICE WITH CONVOLUTION NEURAL NETWORK PROCESSING

(71) Applicant: Samsung Electronics Co., Ltd., Suwon-si (KR)

(72) Inventors: Mostafa Mahmoud, Toronto (CA); Andreas Moshovos, Toronto (CA)

(73) Assignee: Samsung Electronics Co., Ltd., Suwon-si (KR)

( * ) Notice: Subject to any disclaimer, the term of this patent is extended or adjusted under 35 U.S.C. 154(b) by 727 days.

(21) Appl. No.: 16/549,002

(22) Filed: Aug. 23, 2019

(65) Prior Publication Data

US 2020/0065646 A1    Feb. 27, 2020

Related U.S. Application Data

(60) Provisional application No. 62/721,918, filed on Aug. 23, 2018.

(30) Foreign Application Priority Data

Dec. 10, 2018    (KR) .................. 10-2018-0158379

(51) Int. Cl.
*G06N 3/04* (2023.01)
*G06F 7/533* (2006.01)
(Continued)

(52) U.S. Cl.
CPC ............ *G06V 10/955* (2022.01); *G06F 7/533* (2013.01); *G06F 18/2163* (2023.01); *G06N 3/04* (2013.01); *G06V 10/454* (2022.01); *G06V 10/82* (2022.01)

(58) Field of Classification Search
CPC .. G06N 3/04; G06N 3/02; G06N 7/02; G06V 10/443; G06V 30/18019; G06V 10/454;
(Continued)

(56) References Cited

U.S. PATENT DOCUMENTS

| 8,250,109 B2 | 8/2012 | Dallmeier et al. |
| 9,064,116 B2 | 6/2015 | Triantafillou et al. |

(Continued)

FOREIGN PATENT DOCUMENTS

KR    10-2018-0101978 A    9/2018

OTHER PUBLICATIONS

Krist, J., "Deconvolution of Hubble Space Telescope Images Using Simulated Point Spread Functions", *Astronomical Data Analysis Software and Systems*, vol. 25, 1992, pp. 226-228 (3 pages in English).

(Continued)

*Primary Examiner* — Edward F Urban
*Assistant Examiner* — Duy Tran
(74) *Attorney, Agent, or Firm* — NSIP Law

(57) ABSTRACT

A processor-implemented method implementing a convolution neural network includes: determining a plurality of differential groups by grouping a plurality of raw windows of an input feature map into the plurality of differential groups; determining differential windows by performing, for each respective differential group of the differential groups, a differential operation between the raw windows of the respective differential group; determining a reference element of an output feature map corresponding to a reference raw window among the raw windows by performing a convolution operation between a kernel and the reference raw window; and determining remaining elements of the output feature map by performing a reference element summation operation based on the reference element and each of a plurality of convolution operation results determined by performing respective convolution operations between the kernel and each of the differential windows.

22 Claims, 14 Drawing Sheets

(51) Int. Cl.
| | |
|---|---|
| *G06K 9/54* | (2006.01) |
| *G06K 9/46* | (2006.01) |
| *G06K 9/62* | (2022.01) |
| *G06V 10/94* | (2022.01) |
| *G06F 18/21* | (2023.01) |
| *G06V 10/82* | (2022.01) |
| *G06V 10/44* | (2022.01) |

(58) Field of Classification Search
CPC ...... G06V 10/476; G06V 10/20; G06V 10/00; G06V 10/70; G06V 10/87; G06V 10/88; G06V 10/92; G06V 30/16; G06V 30/168; G06V 30/199; G06V 30/20; G06V 10/765; G06V 30/19153; G06F 7/533; G06F 7/76; G06K 9/6261; G06K 9/627
See application file for complete search history.

(56) References Cited

U.S. PATENT DOCUMENTS

| | | | |
|---|---|---|---|
| 9,912,952 B2 | 3/2018 | Zhao et al. | |
| 2004/0254901 A1* | 12/2004 | Bonabeau | G06N 3/126 706/13 |
| 2012/0026295 A1* | 2/2012 | Nishimura | H04N 13/128 348/46 |
| 2016/0358069 A1* | 12/2016 | Brothers | G06F 7/764 |
| 2017/0097884 A1* | 4/2017 | Werner | G06F 15/76 |
| 2017/0221176 A1* | 8/2017 | Munteanu | G06V 10/955 |
| 2017/0323196 A1* | 11/2017 | Gibson | G06N 3/08 |
| 2018/0032857 A1* | 2/2018 | Lele | G06N 3/084 |
| 2018/0046906 A1 | 2/2018 | Dally et al. | |
| 2018/0089562 A1* | 3/2018 | Jin | G06F 7/5443 |
| 2018/0096226 A1* | 4/2018 | Aliabadi | G06V 10/82 |
| 2018/0253636 A1 | 9/2018 | Lee et al. | |

OTHER PUBLICATIONS

Franzen, Rich, "Kodak Lossless True Color Image Suite", source: http://r0k.us/graphics/kodak, Nov. 15, 1999, pp. 1-4 (4 pages in English).

Martin, D et al., "A Database of Human Segmented Natural Images and its Application to Evaluating Segmentation Algorithms and Measuring Ecological Statistics", *Vancouver: ICCV*, 2001, pp. 1-8 (8 pages in English).

Zhang, S et al., "A Neural Network-Based Nonlinear Filter for Image Enhancement", *International Journal of Imaging Systems and Technology*, vol. 12 No. 2, 2002, pp. 56-62 (7 pages in English).

Roth, S et al., "Fields of Experts: A Framework for Learning Image Priors", *IEEE Computer Society Conference on Computer Vision and Pattern Recognition (CVPR'05)*, vol. 2, 2005, pp. 1-8 (8 pages in English).

Rahim, H et al., A Statistical Evaluation of Recent Full Reference Image Quality Assessment Algorithms, *IEEE Transactions on Image Processing*, Mar. 18, 2006, pp. 1-23 (23 pages in English).

Dabov, K et al., "Image Denoising by Sparse 3-D Transform-Domain Collaborative Filtering", *IEEE Transactions on Image Processing*, vol. 16, No. 8, Aug. 2007, pp. 2080-2095 (16 pages in English).

Zeyde, R et al., "On Single Image Scale-Up using Sparse-Representations", *International conference on curves and surfaces*, 2010, pp. 1-20 (20 pages in English).

Zhang, L et al., "Color Demosaicking by Local Directional Interpolation and Nonlocal Adaptive Thresholding", *Journal of Electronic imaging*, vol. 20, No. 2, 2011, pp. 1-29 (29 pages in English).

Bevilacqua, M et al., "Low-Complexity Single-Image Super-Resolution Based on Nonnegative Neighbor Embedding" 2012, pp. 1-10 (10 pages in English).

Gu, S et al., "Weighted Nuclear Norm Minimization with Application to Image Denoising", *Proceedings of the IEEE conference on computer vision and pattern recognition*, 2014, pp. 1-8 (8 pages in English).

Chen Y, et al., "daDianNao: A Machine-Learning Supercomputer", *Proceedings of the 47th Annual IEEE/ACM International Symposium on Microarchitecture*, 2014, pp. 609-622 (14 pages in English).

Schuler, C et al., "Learning to Deblur", arXiv:1406.7444v1, Jun. 28, 2014, pp. 1-28 (28 pages in English).

Yang, CY et al., "Single-Image Super-Resolution: A Benchmark", *European Conference on Computer Vision*, Sep. 2014, pp. 1-15 (15 pages in English).

Szegedy C, et al., "Going Deeper with Convolutions", arXiv:1409.4842v1, Sep. 17, 2014, pp. 1-12 (12 pages in English).

Girshick R, et al., "Rich Feature Hierarchies for Accurate Object Detection and Semantic Segmentation", arXiv:1311.2524v5, Oct. 22, 2014, pp. 1-21 (21 pages in English).

Hannum A, et al., "Deep Speech: Scaling up end-to-end Speech Recognition", arXiv:1412.5567v2, Dec. 19, 2014, pp. 1-12 (12 pages in English).

Lebrun, M et al., "The Noise Clinic: A Blind Image Denoising Algorithm", *Image Processing On Line*, 2015, pp. 1-54 (54 pages in English).

Jenner, L, "Hubble's High-Definition Panoramic View of the Andromeda Galaxy", *NASA*, Jan. 5, 2015, pp. 1-2 (2 pages in English).

Dong, C et al., Compression Artifacts Reduction by a Deep Convolutional Network, arXiv:1504.06993v1, Apr. 27, 2015, pp. 1-9 (9 pages in English).

Dong, C et al., "Image Super-Resolution Using Deep Convolutional Networks", arXiv:1501.00092v3, Jul. 31, 2015, pp. 1-14 (14 pages in English).

Hradis, M et al., "Convolutional Neural Networks for Direct Text Deblurring", *Proceedings of BMVC*, vol. 10, Sep. 2015, pp. 1-13 (13 pages in English).

He, K et al., "Deep residual Learning for Image Recognition", arXiv:1512.03385v1, Dec. 10, 2015, pp. 1-12 (12 pages in English).

Long, J et al., "Fully Convolutional Networks for Semantic Segmentation", *Proceedings of the IEEE conference on computer vision and pattern recognition*, 2015, pp. 1-10 (10 pages in English).

Han, S et al., "EIE: Efficient Inference Engine on Compressed Deep Neural Network", arXiv:1602.01528v2, May 3, 2016, pp. 1-12 (12 pages in English).

Yang, X et al., "A Systematic Approach to Blocking Convolutional Neural Networks", arXiv:1606.04209v1, Jun. 14, 2016, pp. 1-12 (12 pages in English).

Reagen, B et al., "Minerva: Enabling Low-Power, Highly-Accurate Deep Neural Network Accelerators", *ACM/IEEE 43rd Annual International Symposium on Computer Architecture (ISCA)*, Jun. 18, 2016, pp. 1-12 (12 pages in English).

Judd, P et al., "Proteus: Exploiting Numerical Precision Variability in Deep Neural Networks", *Proceedings of the 2016 International Conference on Supercomputing*, 2016 pp. 1-6 (6 pages in English).

Zhang, K et al., "Beyond a Gaussian Denoiser: Residual Learning of Deep CNN for Image Denoising", arXiv:1608.03981v1, Aug. 13, 2016, pp. 1-13 (13 pages in English).

Shi, W et al., "Real-Time Single Image and Video Super-Resolution Using an Efficient Sub-Pixel Convolutional Neural Network", arXiv:1609.05158v2, Sep. 23, 2016, pp. 1-10 (10 pages in English).

Badrinarayanan, V et al., "SegNet: A Deep Convolutional Encoder-Decoder Architecture for Image Segmentation", arXiv:1511.00561v3, Oct. 10, 2016, pp. 1-14 (14 pages in English).

Albericio, J et al., "Cnvlutin: Ineffectual-Neuron-Free Deep Neural Network Computing", *ACM SIGARCH Computer Architecture News*, vol. 44 No. 3, Oct. 12, 2016, pp. 1-13 (13 pages in English).

Judd, P et al., "Stripes: Bit-Serial Deep Neural Network Computing", *49th Annual IEEE/ACM International Symposium on Microarchitecture (MICRO)*, 2016, pp. 1-12 (12 pages in English).

Gharbi, M et al., "Deep Joint Demosaicking and Denoising", *ACM Transactions on Graphics (TOG)*, vol. 36, No. 6, Nov. 2016, pp. 1-12 (12 pages in English).

Kim, J et al., "Deeply-Recursive Convolutional Network for Image Super-Resolution", arXiv:1511.04491v1, Nov. 11, 2016, pp. 1-9 (9 pages in English).

Kim, J et al., "Accurate Image Super-Resolution Using Very Deep Convolutional Networks", arXiv:1511.04587v2, Nov. 11, 2016, pp. 1-9 (9 pages in English).

(56) References Cited

OTHER PUBLICATIONS

Lin, G et al., "RefineNet: Multi-Path Refinement Networks for High-Resolution Semantic Segmentation", arXiv:1611.06612v3, Nov. 25, 2016, pp. 1-11 (11 pages in English).
Redmon, J et al., "YOLO9000: Better, Faster, Stronger", arXiv:1612.08242v1, Dec. 25, 2016, pp. 1-9 (9 pages in English).
Chen, Y et al., "Eyeriss: An Energy-Efficient Reconfigurable Accelerator for Deep Convolutional Neural Networks", *IEEE Journal of Solid-State Circuits*, vol. 52 No. 1, Jan. 2017, pp. 127-138 (12 pages in English).
Albericio J, et al., "Bit-Pragmatic Deep Neural Network Computing", *Proceedings of the 50th Annual IEEE/ACM International Symposium on Microarchitecture*, 2017, pp. 382-394 (13 pages in English).
Zhang, K et al., "Learning Deep CNN Denoiser Prior for Image Restoration", arXiv:1704.03264v1, Apr. 11, 2017, pp. 1-10 (10 pages in English).
Mukkara, A et al., "SCNN: An Accelerator for Compressed-Sparse Convolutional Neural Networks", arXiv:1708.04485v1, May 23, 2017, pp. 1-12 (12 pages in English).
Ledig, C et al., "Photo-Realistic Single Image Super-Resolution Using a Generative Adversarial Network", arXiv:1609.04802v5, May 25, 2017, pp. 1-19 (19 pages in English).
Delmas, A et al., "Dynamic Stripes: Exploiting the Dynamic Precision Requirements of Activation Values in Neural Networks", arXiv:1706.00504v1, Jun. 1, 2017, pp. 1-3 (3 pages in English).
Cavigelli, L et al., "CBinfer: Change-Based Inference for Convolutional Neural Networks on Video Data", arXiv:1704.04313v2, Jun. 21, 2017, pp. 1-8 (8 pages in English).
Mahmoud, M et al., "IDEAL: Image DEnoising Accelerator", *50th Annual IEEE/ACM International Symposium on Microarchitecture (MICRO)*, 2017, pp. 1-14 (14 pages in English).
Zhu, Y et al., "Euphrates: Algorithm-SoC Co-Design for Low-Power Mobile Continuous Vision", arXiv:1803.11232v1, Mar. 29, 2018, pp. 1-14 (14 pages in English).
Nah, S et al., "Deep Multi-Scale Convolutional Neural Network for Dynamic Scene Deblurring", arXiv:1612.02177v2, May 7, 2018, pp. 1-21 (21 pages in English).
Zhang, K et al., "FFDNet: Toward a Fast and Flexible Solution for CNN Based Image Denoising", arXiv:1710.04026v2, May 22, 2018, pp. 1-15 (15 pages in English).
Munn, Dave, "Neat Image Best Noise Reduction for Digital Cameras and Scanners", *Neat Image*, Aug. 13, 2019, pp. 1-5 (5 pages in English).
The University of Texas at Austin, "LIVE Image Quality Assessment Database, *Laboratory for Image and Video Engineering*" 2019, pp. 1-2 (2 pages in English).
Davies A, "Canon PowerShot G5 X Mark II Review", *Photography Blog*, 2019, pp. 1-7 (7 pages in English).
"Create a Better Starting Point for Faster Physical Implementation", *Design Complier Graphical*, 2019, pp. 1-5 (5 pages in English).
"Innovus Implementation System", *Cadence Design System, Inc.*, 2019, pp. 1-3 (3 pages in English).

* cited by examiner

METHOD AND DEVICE WITH CONVOLUTION NEURAL NETWORK PROCESSING

CROSS-REFERENCE TO RELATED APPLICATIONS

This application is based on and claims the benefit of U.S. Provisional Patent Application No. 62/721,918, filed on Aug. 23, 2018, in the United States Patent and Trademark Office, and claims priority under 35 U.S.C. § 119 to Korean Patent Application No. 10-2018-0158379, filed on Dec. 10, 2018, in the Korean Intellectual Property Office, the disclosures of which are incorporated herein by reference in their entirety

BACKGROUND

1. Field

The present disclosure relates to methods and devices with convolution neural network processing.

2. Description of the Related Art

A neural network refers to a computational architecture. A neural network device may be used to input data and extract valid information in a variety of electronic systems. Devices for processing a neural network may use large amounts of operations on complex input data.

SUMMARY

Provided are methods and devices for processing a convolution neural network.

Additional aspects will be set forth in part in the description which follows and, in part, will be apparent from the description, or may be learned by practice of the presented embodiments.

In one general aspect, a method implementing a convolution neural network includes: determining a plurality of differential groups by grouping a plurality of raw windows of an input feature map into the plurality of differential groups; determining differential windows by performing, for each respective differential group of the differential groups, a differential operation between the raw windows of the respective differential group; determining a reference element of an output feature map corresponding to a reference raw window among the raw windows by performing a convolution operation between a kernel and the reference raw window; and determining remaining elements of the output feature map by performing a reference element summation operation based on the reference element and each of a plurality of convolution operation results determined by performing respective convolution operations between the kernel and each of the differential windows.

The raw windows may be determined from the input feature map according to a sliding window fashion, wherein the grouping of the raw windows into the differential groups may include grouping, for each respective differential group, two of the raw windows into the respective differential group, and wherein the two of the raw windows may be adjacent in a sliding direction of to the sliding window fashion.

The determining of the differential windows may include performing, for the each respective differential group, an element-wise differential operation between the two adjacent raw windows of the respective differential group.

The performing of the summation operation may include performing the summation operation between the reference element and each of a plurality of cascading summation results determined by performing a cascading summation operation on each of the convolution operation results.

The performing of the cascading summation operation on one of the convolution operation results may include summing the one of the convolution operation results and other ones of the convolution operation results, wherein the other ones of the convolution operation results correspond to one or more differential windows preceding, in the sliding direction, a differential window corresponding to the one of the convolution operation results.

The method may further include: in response to each of the differential windows being a bit data format, converting each of the differential windows into a data format comprising information about a significant bit digit representing a bit value of 1, wherein the convolution operation results between the kernel and each of the differential windows are convolution operation results between the kernel and each of the differential windows converted into the data format.

The convolution operation results between the kernel and each of the differential windows converted into the data format may be results calculated according to a bit-shift operation result based on the information about the significant bit digit.

The method may further include preprocessing the differential windows according to a booth algorithm that reduces significant bit digits, as pre-processing for converting the data format.

The method may further include: performing, using the convolution neural network, any one or any combination of any two or more of denoising, demosaicking, sharpening, deblurring, and super-resolution imaging of an image based on the output feature map, wherein the convolution neural network is a computational imaging deep neural network (CI-DNN).

A non-transitory computer-readable storage medium may store instructions that, when executed by one or more processors, cause the one or more processors to perform the method.

In another general aspect, a neural network processing device includes: one or more neural network processors configured to: determine a plurality of differential groups by group a plurality of raw windows of an input feature map into the plurality of differential groups; determine differential windows by performing, for each respective differential group, a differential operation between the raw windows of the respective differential group; determine a reference element of an output feature map corresponding to a reference raw window among the raw windows by performing a convolution operation between a kernel and the reference raw window; and determine remaining elements of the output feature map by performing a reference element summation operation based on the reference element and each of a plurality of convolution operation results determined by performing a convolution operation between the kernel and each of the differential windows.

The raw windows may be determined from the input feature map according to a sliding window fashion, wherein the grouping of the raw windows into the differential groups comprises grouping, for each respective differential group, two of the raw windows into the respective differential group, and wherein the two of the raw windows are adjacent in a sliding direction of to the sliding window fashion.

For the determining of the differential windows, the one or more processors may be further configured to perform an element-wise differential operation between the two adjacent raw windows of the respective differential group.

For the performing of the summation operation, the one or more processors may be further configured to perform the summation operation between the reference element and each of a plurality of cascading summation results determined by performing a cascading summation operation on each of the convolution operation results.

The performing of the cascading summation operation on one of the convolution operation results may include summing the one of the convolution operation results and other ones of the convolution operation results, wherein the other ones of the convolution operation results correspond to one or more differential windows preceding, in the sliding direction, a differential window corresponding to the one of the convolution operation results.

The one or more processors may be further configured to convert, in response to each of the differential windows being a bit data format, each of the differential windows into a data format comprising information about a significant bit digit representing a bit value of 1, wherein the convolution operation results between the kernel and each of the differential windows are convolution operation results between the kernel and each of the differential windows converted into the data format.

The convolution operation results between the kernel and each of the differential windows converted into the data format may be results calculated according to a bit-shift operation result based on the information about the significant bit digit.

The one or more processors may be further configured to preprocess the differential windows according to a booth algorithm that reduces significant bit digits, as pre-processing for converting the data format.

In another general aspect, a processor-implemented method implementing a convolution neural network includes: determining a first raw window and a second raw window, each respectively comprising an array of features of an input feature map; determining a differential window based on an element-wise difference between the first and the second raw window; and determining elements of an output feature map based on a convolution operation between a kernel and the first raw window and a convolution operation between the kernel and the differential window.

The determining of the elements of the output feature map may include: determining a first element of the output feature map as a result of the convolution operation between the kernel and the first raw window; and determining a second element of the output feature map as a result of a summation of the first element and a result of the convolution operation between the kernel and the differential window.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
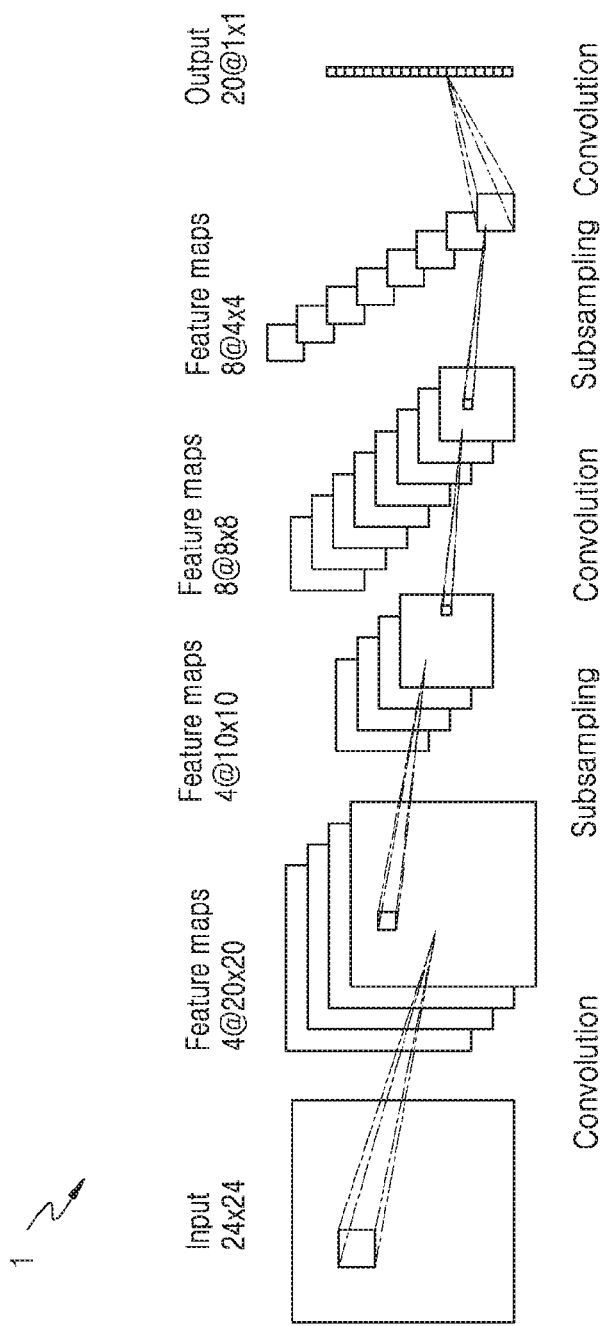
FIG. 1 illustrates an architecture of a neural network.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

In the description of the embodiments, when a part is connected to another part, it includes not only a case where the part is directly connected but also a case where the part is electrically connected with another part in between. Also, when a part includes a constituent element, it means that the embodiment may include other elements other than the exclusion of other elements unless specifically stated otherwise.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and after an understanding of the disclosure of this application. Terms, such as those defined in commonly used dictionaries, are to be interpreted as having a meaning that is consistent with their meaning in the context of the relevant art and the disclosure of this application, and are not to be interpreted in an idealized or overly formal sense unless expressly so defined herein.

In one or more embodiments of the present disclosure, a neural network device may efficiently analyze a large amount of input data in real time and extract targeted information by using a neural network.

FIG. 1 illustrates an architecture of a neural network.

Referring to FIG. 1, the neural network 1 may have an architecture of a deep neural network (DNN) or an architecture of an n-layer neural network. The DNN or the n-layer neural network may correspond to a convolutional neural network (CNN), a recurrent neural network (RNN), a deep belief network, restricted Boltzmann machines, etc. For example, the neural network 1 may be implemented as a CNN. However, the neural network 1 is not limited thereto. The CNN, which is the example of the neural network 1 illustrated in FIG. 1, may include a sub-sampling layer, a pooling layer, a fully connected layer, etc., in addition to a convolution layer.

Thus, as illustrated, neural network 1 may be implemented as an architecture having a plurality of layers including an input image layer, feature map generating layers, and an output layer. In the neural network 1, a convolution operation between the input image and a filter referred to as a kernel may be performed, and as a result of the convolution operation, the feature maps (or activation maps or convolved features) may be output. Here, the feature maps that are output are input feature maps, and a convolution operation between the output feature maps and the kernel is performed again, and as a result, new feature maps are output. Based on such repeatedly performed convolution operations, ultimately, results of recognition of characteristics of the input image via the neural network 1 may be output.

For example, when an image having a size of 24×24 pixels is input to the neural network 1 of FIG. 1, the input image may be output as feature maps of 4 channels having a 20×20 size via a convolution operation between the input image and the kernel. Next, the size of the feature maps having the 20×20 size may be decreased via repeated convolution operations between the feature maps and the kernel. Thus, ultimately, characteristics of a 1×1 size may be output. In the neural network 1, a convolution operation and sub-sampling (or pooling) may be repeatedly performed in a plurality of layers, and thus, robust characteristics, which may represent a general image, may be filtered from the image and may be output. Also, the output ultimate characteristics may be input to the fully connected layer so as to ultimately derive a recognition result of the input image. Based on the above, it is understood that example embodiments discussed herein include embodiments with one or more, in various combinations, or all such layers, stages, edges, etc. in operations of the neural network 1.

Figure 2A:
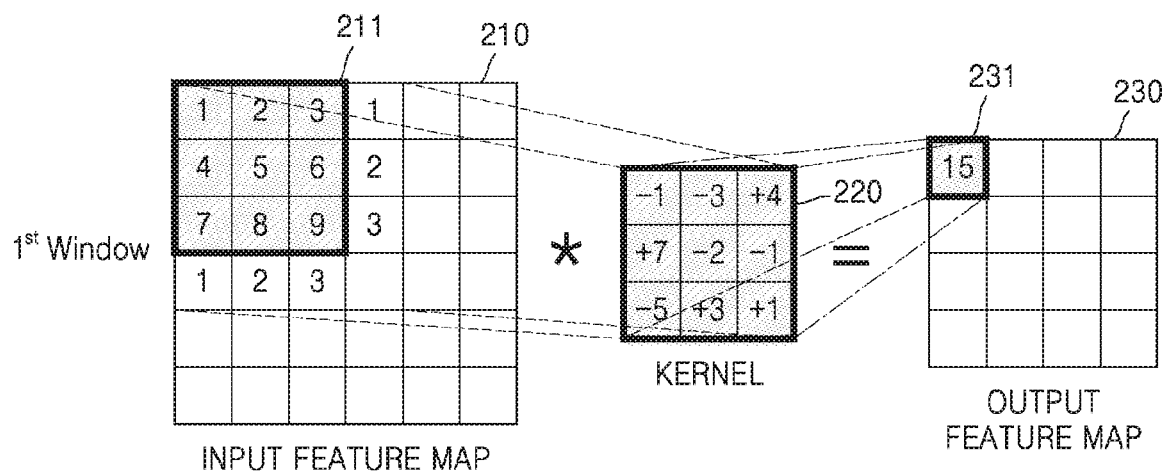
FIGS. 2A and 2B illustrate convolution operations of a neural network.
Figure 2A:
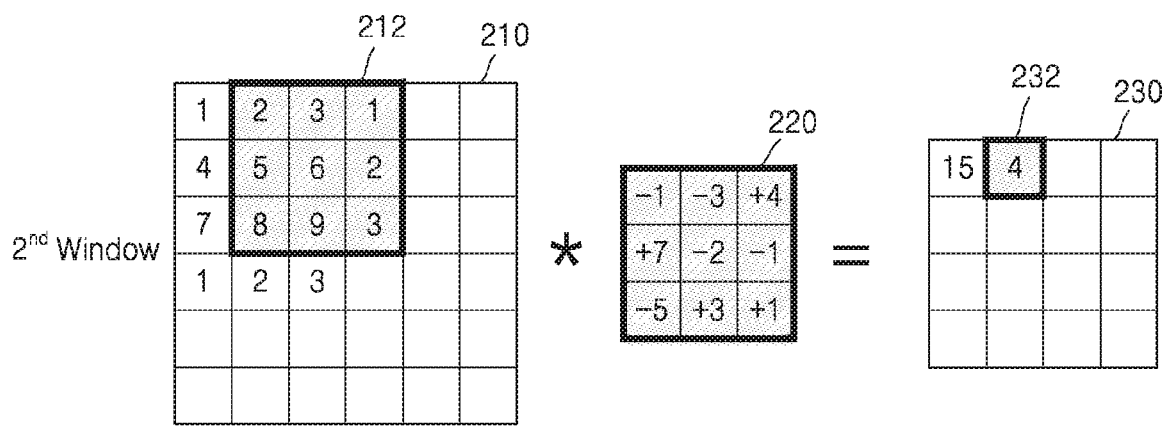
Figure 2A:
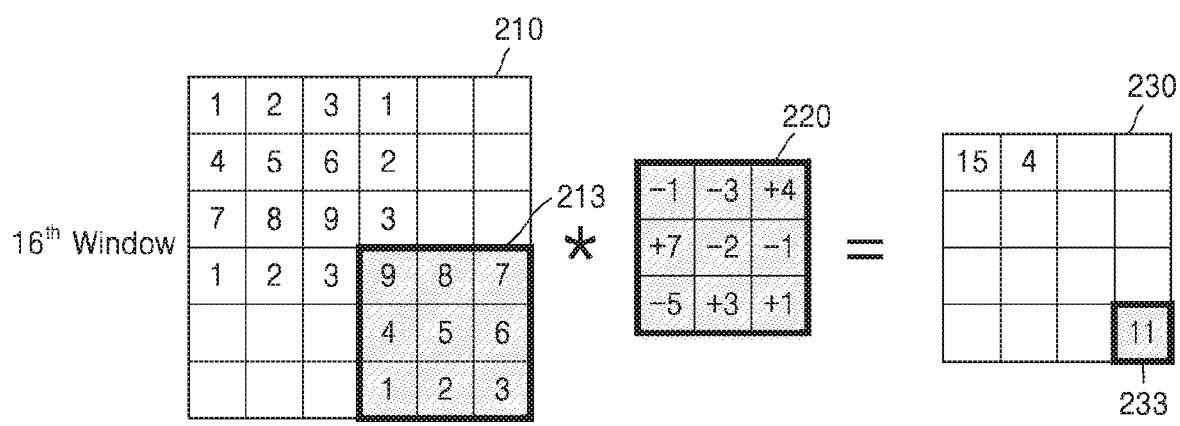
Figure 2B:
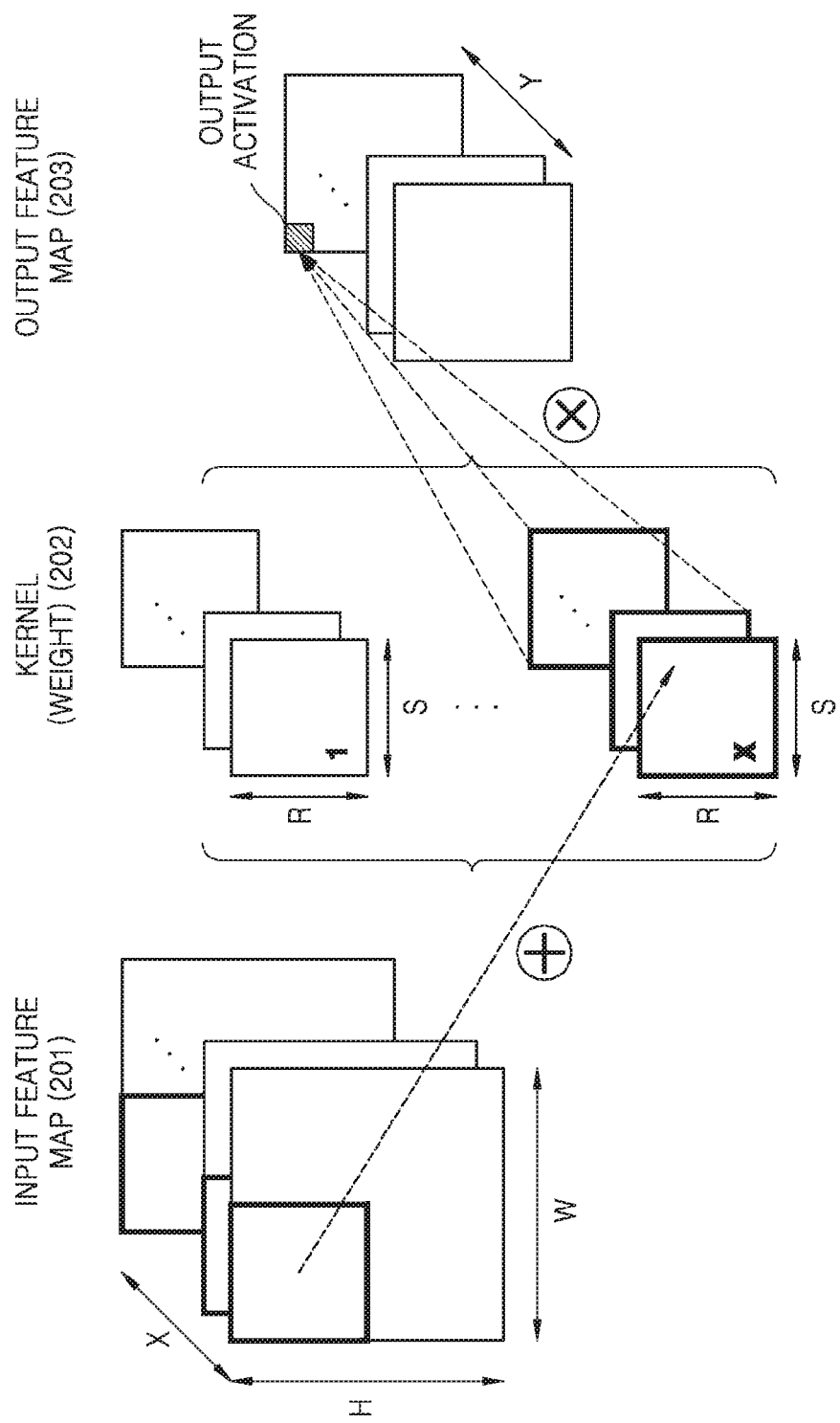

FIGS. 2A and 2B illustrate convolution operations of a neural network.

In one or more embodiments, an input feature map 210 for an input image may have a 6×6 pixel size, an original kernel 220 may have a 3×3 pixel size, and an output feature map 230 may have a 4×4 pixel size, as shown in the example of FIG. 2A, but the pixel sizes are not limited thereto. The neural network may be implemented with various sizes of feature maps and kernels. Also, values defined in the input feature map 210, the original kernel 220, and the output feature map 230 are all exemplary values, and the present embodiments are not limited thereto. Each pixel of the input feature map may include a pixel value.

The original kernel 220 may perform the convolution operation while sliding in a window unit of the 3×3 pixel size (sliding window fashion) in the input feature map 210. The convolution operation may include an operation of summing all values obtained by multiplying each pixel data of a window of the input feature map 210 and a weight of each element of the corresponding position in the original kernel 220 and obtaining each pixel data of the output feature map 230. For example, the original kernel 220 may first perform the convolution operation with a first window 211 of the input feature map 210. For example, pixel values 1, 2, 3, 4, 5, 6, 7, 8, and 9 of the first window 211 may be respectively multiplied by weights −1, −3, +4, +7, −2, −1, −5, +3, and +1 of elements of the original kernel 220, and as a result, values −1, −6, 12, 28, −10, −6, −35, 24, and 9 may be obtained. Next, a value of 15 may be obtained by summing the obtained values 1, −6, 12, 28, −10, −6, −35, 24, and 9. A pixel value 231 of a first row and a first column position of the output feature map 230 may thus be determined to be 15. Here, the pixel value 231 of the first row and the first column of the output feature map 230 may correspond to the first window 211. In a similar manner, the convolution operation may be performed between a second window 212 of the input feature map 210 and the original kernel 220 such that 4 is determined as a pixel value 232 of the first row and a second column position of the output feature map 230. The convolution operation may be respectively performed between first through sixteenth windows of the input feature map and the original kernel 220 such that pixel values for each position of the output feature map 230 are determined. For example, the convolution operation may be performed between a 16th window 213 (e.g., a last window of the input feature map 210) and the original kernel 220 such that 11 is determined as a pixel value 233 of a fourth row and a fourth column position of the output feature map 230.

That is, the convolution operation between the one input feature map 210 and the one source kernel 220 may be performed by repeatedly processing multiplications of values of elements corresponding to each other in the input feature map 210 and the original kernel 220 and the sum of multiplication results, and the output feature map 230 may be generated as a result of the convolution operation.

Although a two-dimensional convolution operation is described with reference to FIG. 2A, the convolution operation may correspond to a three-dimensional convolution operation in which input feature maps, kernels, and output feature maps of a plurality of channels exist. An example of such three-dimensional convolution operation will be described with reference to FIG. 2B.

Referring to FIG. 2B, X channels may be present in input feature maps 201, and an input feature map of each channel may have a size of H rows and W columns (X, W, and H are natural numbers). Each of kernels 202 may have a size of R rows and S columns. The number of channels of the kernels 202 may correspond to (e.g., may equal) the number of channels X of the input feature maps 201 and the number of channels Y of the output feature maps 203 (R, S, and Y are natural numbers). The output feature maps 203 may be generated through the three-dimensional convolution operation between the input feature maps 201 and the kernels 202. Y channels may be present according to the convolution operation.

An example process of generating an output feature map through a convolution operation between one input feature map and one kernel may be as described above with reference to FIG. 2A. The two-dimensional convolution operation as described above with reference to FIG. 2A may be repeatedly performed between the input feature maps 201 of all channels and the kernels 202 of all channels such that the output feature maps 203 of all channels may be generated. Based on the above, it is understood that example embodiments discussed herein may include embodiments with one or more, in various combinations, or all channels X in an input feature map and/or channels Y of an output feature map.

Figure 3:
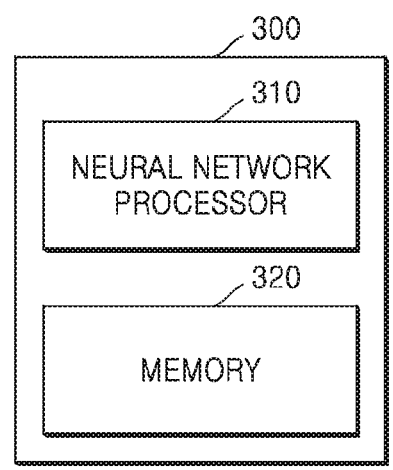
FIG. 3 illustrates hardware components of a neural network processing device according to one or more embodiments.

FIG. 3 illustrates hardware components of a neural network processing device 300 according to one or more embodiments.

Referring to FIG. 3, the neural network processing device 300 may include a neural network processor 310 and a memory 320. It will be understood to one of ordinary skill in the art after an understanding of the present disclosure that the neural network processing device 300 may further include other general-purpose components in addition to the components illustrated in FIG. 3.

The neural network processor 310 may be implemented as a central processing unit (CPU), a graphics processing unit (GPU), an application processor (AP), etc., but is not limited thereto.

The memory 320 may include random-access memory (RAM), such as dynamic random-access memory (DRAM) and static random-access memory (SRAM), read-only memory (ROM), electrically erasable programmable read-only memory (EEPROM), CD-ROM, blue-rays or other optical disc storages, a hard disk drive (HDD), a solid state drive (SSD), and/or flash memory, but is not limited thereto.

The neural network processing device 300 may be included in a neural network device to control general functions for driving a neural network. For example, the neural network processing device 300 may control an operation processing process of extracting an output feature map from an input feature map of the neural network device.

Here, the neural network device may be, and/or be implemented as, various types of apparatuses, such as a personal computer (PC), a server, a mobile device, an embedded device, etc. For example, the neural network processing device 300 may be or include include a smartphone, a tablet device, an augmented reality (AR) device, an Internet of things (IoT) device, an autonomous vehicle, a robotic device, a medical device, etc., which perform voice recognition, image recognition, image classification, etc., by using any one or any combination of the neural network layers and/or neural networks made up of one or more of the below discussed layers of nodal convolutional interactions, but is not limited thereto. Further, the neural network processing device 300 may include a hardware (HW) accelerator exclusively equipped in the apparatuses described above, a neural processing unit (NPU) or tensor processing unit (TPU), which, as a non-limiting example, is an exclusive module configured to drive a neural network, or a HW accelerator, such as a neural engine, but is not limited thereto.

The neural network device may include the neural network processing device 300 and an external memory. The neural network processing device 300 including the neural network processor 310 and the memory 320 may be implemented as a single chip, or may be implemented as two or more chips. The memory 320 included in the neural network processing device 300 may be an on-chip memory, and the external memory may be an off-chip memory.

To advantageously reduce a size of a chip, etc., the memory 320 included in the neural network processing device 300 may have a smaller capacity than a capacity of the external memory, as a non-limiting example.

The off-chip memory with the larger capacity may store all input feature maps and weight values of kernels, an output feature map, etc. The neural network processing device 300 may access the external memory to acquire data necessary for the operation and store the acquired data in the memory 320, which is the on-chip memory. The neural network processing device 300 may also store in the memory 320, which is the on-chip memory, an intermediate operation result for generating the output feature map and a part of the output feature map.

If the size of the on-chip memory 320 is small, the size of the chip may be likewise be small. However, as the frequency of access to the off-chip memory increases, traffic may increase. Therefore, it may be advantageous to reduce the data capacity of the intermediate operation result considering the capacity of the on-chip memory 320 and to reduce the access frequency to the off-chip memory to reduce the traffic occurring in the operation processing process.

The neural network processor 310 may process the convolution operation between input feature maps and kernels stored (or buffered) in the memory 320 using elements of the input feature maps, weights of the kernels, etc. At this time, the input feature maps may be related to image data, and the elements of the input feature maps may represent pixels, but are not limited thereto.

One or more neural network processors 310 and one or more memories 320 may be included in the neural network processing device 300 and used to process the convolution operation in parallel and independently, and thus the convolution operation may be efficiently processed.

The neural network processor 310 may include a logic circuit implementing a convolution operator for the convolution operation. The convolution operator is an operator implemented by a combination of a shifter or a multiplier, an adder, an accumulator, and the like. In the convolution operator, each of the shifter, the multiplier, and the adder may be implemented as a combination of a plurality of sub-shifters, sub-multipliers, and sub-adders, respectively.

The neural network processor 310 may group a plurality of raw windows of the input feature map into a plurality of differential groups for a differential operation.

A window represents a sub-feature map of a feature map, wherein a unit size of the window is smaller than a unit size of the feature map. For example, each of the plurality of windows of the input feature map may include elements of some of a plurality of elements constituting the input feature map.

Each of the plurality of windows may overlappingly include some of the elements of the input feature map. For example, the input feature map may be block data in which the elements are arranged in a multidimensional space, and two adjacent windows on the multidimensional space may overlappingly include some of the same elements of the input feature map. As another example, the plurality of windows may not overlap each other.

The multidimensional space of the input feature map may be determined to be highly related to spatially adjacent elements. For example, adjacent elements in the multidimensional space of the input feature map may have similar values. Thus, the multidimensional space of the input feature map may be determined differently according to a type of the input feature map. For example, when the input feature map relates to image data, the multidimensional space may represent a pixel space of the image data.

The raw windows represent windows in which a difference operation between windows is not performed, unlike a differential window.

The neural network processor 310 may determine the plurality of raw windows according to a sliding window fashion. The sliding window fashion is a fashion in which sliding windows having predetermined size and pattern, that is, predetermined shapes, determine a plurality of windows by sliding an input feature map at a constant sliding interval. For example, each of the plurality of windows may be determined by scanning the elements of the input feature map that are partitioned according to the shape of the sliding window in each of a plurality of sliding positions. In this case, a sliding direction may represent spatial directionality between a plurality of windows in the multidimensional space of the input feature map. However, the sliding direction may not represent a temporal posterior in which the plurality of windows are determined or obtained. For example, a window at a preceding position in the sliding direction and windows at following positions may be determined or obtained simultaneously.

The shapes, which are the sizes and patterns of the plurality of windows of the input feature map, may be determined according to the shape of the sliding window. For example, the input feature map may be a three-dimensional block arranged in a three-dimensional space defined by an axis in a row direction (or a longitudinal direction) orthogonal to each other, an axis in a column direction (or a width direction), and an axis in a depth direction. When the sliding window has a rectangular shape having a predetermined size in the column direction and the row direction of the input feature map, the plurality of windows may be sub blocks having the same size as the sliding window in the column direction and the row direction and having the rectangular shape. At this time, the shape of the sliding window may not determine the size of the plurality of windows in the depth direction. The size of the plurality of windows in the depth direction may be the same as the size of the input feature map in the depth direction.

The neural network processor 310 may group a plurality of windows of the input feature map into the plurality of differential groups of a unit in which the differential operation is performed. For example, the neural network processor 310 may group the plurality of windows into differential groups including two adjacent windows. At this time, the differential group may include differential subject windows and differential reference windows which are differentiated from the differential subject windows. The differential subject window may be a window following in a sliding direction, and the differential reference window may be a window preceding with respect to the differential subject window in the sliding direction.

The differential subject window belonging to one differential group of two different differential groups may be the same window as a differential reference window belonging to another differential group. For example, two differential groups may be defined for preceding, intermediate, and following windows, which are three windows disposed adjacent in the sliding direction. At this time, the intermediate window, which is the differential subject window in a differential group including the preceding window and the intermediate window, may be a differential reference window of a next differential group including the intermediate window and the following window.

The neural network processor 310 may generate the differential windows through the differential operation between raw windows belonging to each of the plurality of grouped differential groups.

The neural network processor 310 may generate each of the differential windows through an element-wise differential operation between the differential reference window and the differential subject window belonging to each of the plurality of grouped differential groups. For example, the neural network processor 310 may perform the differential operation between two elements of corresponding positions of each of a differential subject window and differential reference windows having the same shape to obtain the differential window. Thus, a shape of the differential window is the same as shapes of the differential subject window and the differential reference window. The neural network processor 310 may generate each of the differential windows corresponding to the differential subject windows of the differential groups.

The neural network processor 310 may perform a convolution operation between a reference raw window among the raw windows and the kernel to obtain a reference element of an output feature map corresponding to the reference raw window.

The neural network processor 310 may determine at least one reference raw window among the plurality of windows. For example, the neural network processor 310 may group the plurality of windows into a plurality of cascading groups. Each of the windows in the plurality of cascading groups may be adjacent to at least one other window in the cascading groups.

The neural network processor 310 may determine a reference window in each of the plurality of cascading groups. The neural network processor 310 may perform the convolution operation between the reference raw window and the kernel to obtain the reference element of the output feature map corresponding to the reference raw window. The reference element of the output feature map may be obtained directly from a convolution operation result between the reference raw window and the kernel independently from the differential window.

The neural network processor 310 may perform a summation operation with the reference element of the output feature map for the convolution operation results between each of the differential windows and the kernel to obtain the remaining elements of the output feature map.

The neural network processor 310 may perform the convolution operation between each of the plurality of differential windows corresponding to the plurality of differential groups and the kernel. Also, the neural network processor 310 may perform the summation operation with the reference element on cascading summation results of the convolution operation results between each of the differential windows and the kernel, thereby obtaining the remaining elements of the output feature map. Thus, the neural network processor 310 may not need to perform the convolution operation between each of the raw windows, i.e. the differential subject windows, to obtain the remaining elements of the output feature map corresponding to each of the differential subject windows of each of the plurality of differential groups.

Due to the similarity between elements at the corresponding positions of the differential subject window and the differential reference window, since the elements of the differential window have a relatively smaller value than the elements of the raw window, the differential window may be stored using a memory of a relatively small capacity.

The neural network processor 310 may also convert data formats of the differential windows to increase a convolution operation speed between each of the differential windows and the kernel. For example, when each of the differential windows is a bit data format, the neural network processor 310 may convert each of the differential windows into a data format that includes information about a significant bit digit representing a bit value of 1. Also, the neural network processor 310 may pre-process the differential windows according to a booth algorithm for reducing significant bit digits, as preprocessing for converting the data format. The neural network processor 310 may perform a bit-shift operation based on information about the significant bit digit of each of the converted differential windows and calculate a convolution operation result between the differential window and the kernel therefrom. In calculating the convolution operation result, the neural network processor 310 may reduce the memory capacity and increase the operation processing speed by converting each of the differential windows into the data format having a relatively small amount of information and using a shift operation with less load on the operation processing.

Figure 4:
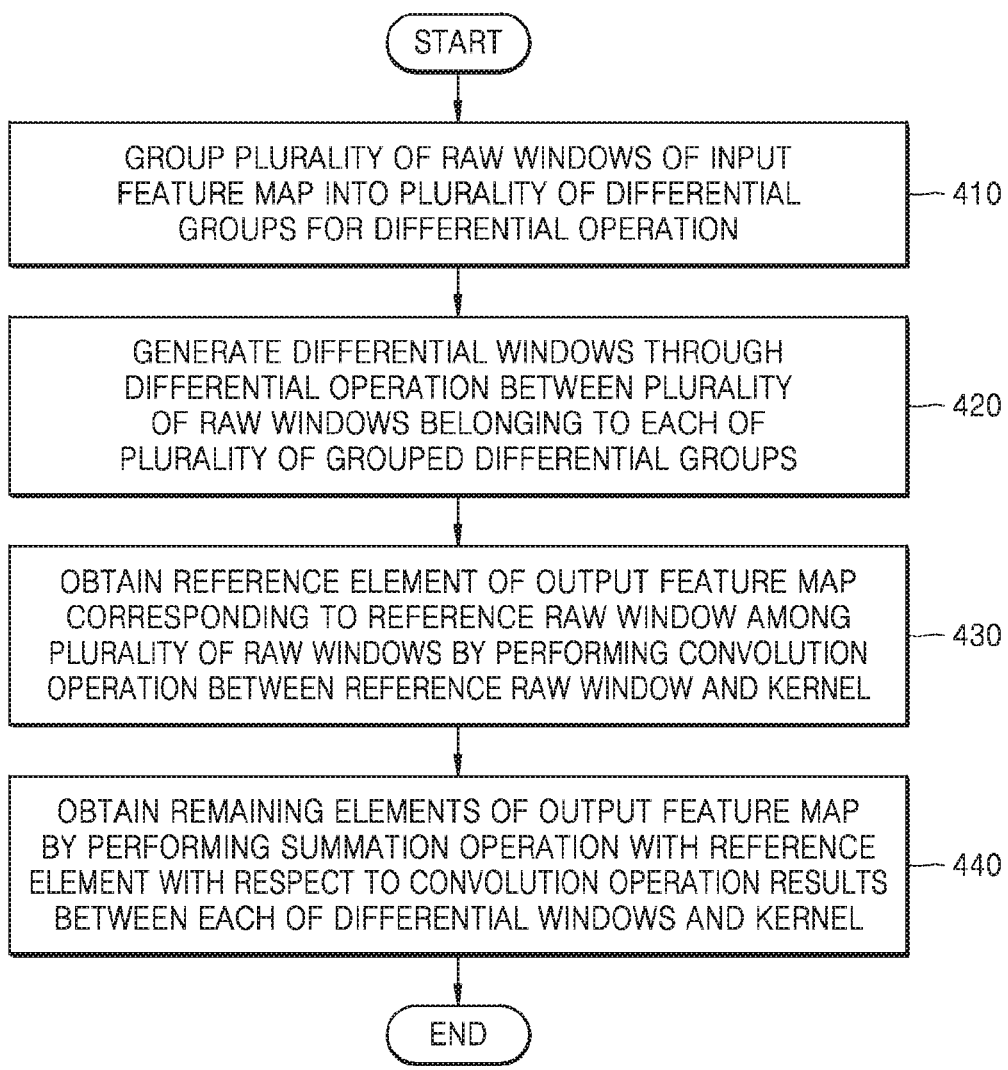
FIG. 4 illustrates a method of implementing a convolution neural network according to an embodiment.

FIG. 4 illustrates a method of processing a convolution neural network according to one or more embodiments.

As a non-limiting example, the method of processing the convolution neural network shown in FIG. 4 may be performed by the neural network processing device (300 of FIG. 3) described in the above-described drawings, and thus even when omitted below, descriptions provided in the above-described drawings may be applied to the method of FIG. 4. Thus, while operations of FIG. 4 will be explained with references to the neural network processing device 300, embodiments are not limited thereto.

In operation 410, the neural network processing device 300 may group a plurality of raw windows of an input feature map into a plurality of differential groups for a differential operation.

The neural network processing device 300 may determine the plurality of raw windows according to a sliding window fashion.

The neural network processing device 300 may group the plurality of windows of the input feature map into the plurality of differential groups of a unit in which the differential operation is performed. For example, the neural network processing device 300 may group the plurality of windows into the differential groups including two adjacent windows.

In operation 420, the neural network processing device 300 may generate the differential windows through the differential operation between the raw windows belonging to each of the plurality of grouped differential groups.

The neural network processing device 300 may generate each of the differential windows through an element-wise differential operation between a differential reference window and a differential subject window belonging to each of the plurality of grouped differential groups. For example, the neural network processing device 300 may perform the differential operation between two elements of positions corresponding to the differential reference window and the differential subject window having the same shape to obtain the differential window. Accordingly, the neural network processing device 300 may generate, for each of the differential groups, each of the differential windows corresponding to the differential subject window.

In operation 430, the neural network processing device 300 may perform a convolution operation between the reference raw window among the raw windows and the kernel to obtain a reference element of an output feature map corresponding to the reference raw window.

The neural network processing device 300 may determine at least one reference raw window among the plurality of windows. For example, the neural network processing device 300 may group the plurality of windows into a plurality of cascading groups. Each of the windows in the plurality of cascading groups may be adjacent to at least one other window in the cascading groups. Also, the neural network processing device 300 may determine a reference window in each of the plurality of cascading groups.

The neural network processing device 300 may perform the convolution operation between an element of the reference raw window and an element of the kernel of a corresponding position to obtain a reference element of the output feature map corresponding to the reference raw window.

In operation 440, the neural network processing device 300 may perform a summation operation with the reference element for convolution operation results between each of the differential windows and the kernel to obtain the remaining elements of the output feature map.

The neural network processing device 300 may perform the convolution operation between each of a plurality of differential windows corresponding to the plurality of differential groups and the kernel. Further, the neural network processing device 300 may perform the summation operation with the reference element for cascading summation results of the convolution operation results between each of the differential windows and the kernel, thereby obtaining the remaining elements of the output feature map.

Also, the neural network processing device 300 may convert data formats of the differential windows. For example, when each of the differential windows is a bit data format, the neural network processing device 300 may convert the data format of each of the differential windows into a data format that includes information about a significant bit digit representing a bit value of 1. Also, the neural network processing device 300 may pre-process the differential window according to a booth algorithm for reducing significant bit digits, as preprocessing for converting the data format. The neural network processing device 300 may calculate the convolution operation result between the differential window and the kernel based on a bit-shift operation result according to information about the significant bit digit of each of the converted differential windows.

Figure 5:
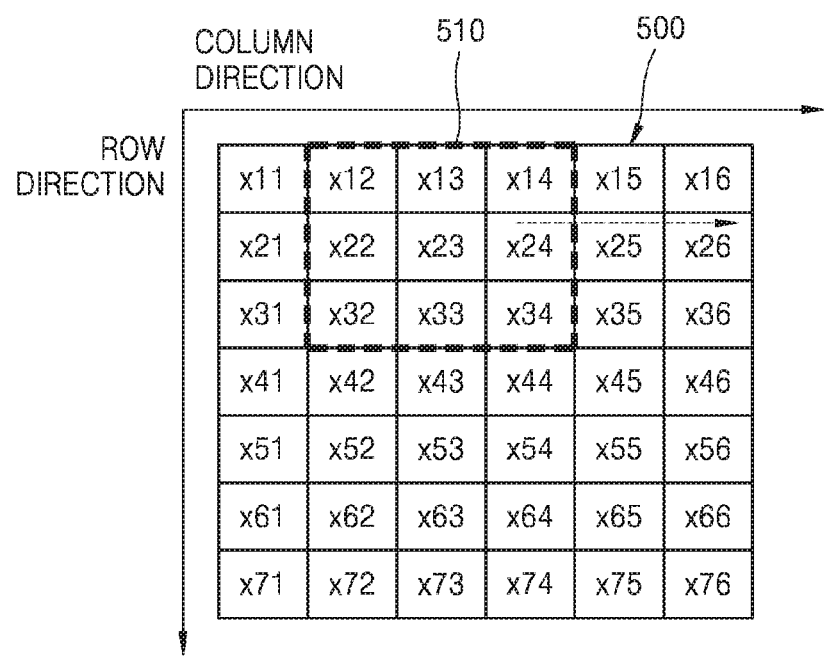
FIG. 5 illustrates an input feature map according to one or more embodiments.

FIG. 5 illustrates an input feature map (e.g., input feature map 500) according to one or more embodiments.

In FIG. 5, an embodiment in which an input feature map 500 is two-dimensional array data is shown, but the input feature map 500 may be three-dimensional block data or other various types of data and is not limited to the present embodiment.

Referring to FIG. 5, the input feature map 500 is the two-dimensional array data having a 7×6 element size in row and column directions. The input feature map 500 may include 7×6=42 elements. When the input feature map 500 relates to image data, each of the elements may correspond to a respective pixel.

In FIG. 5, each of the elements of the input feature map 500 may be expressed in a combination of an index representing a row and an index representing a column. For example, an element in third row and second column of the input feature map 500 may be denoted by X32.

In FIG. 5, a sliding window 510 for determining raw windows of the input feature map 500 is shown. According to sliding window fashion, the sliding window 510 may slide over the input feature map 500 at a predetermined number of element intervals and extract the raw windows. In the present embodiments, when a window is not referred to as a differential window, the window refers to a raw window distinguished from the differential window.

In FIG. 5, the sliding window 510 has a 3×3 element size in the row direction and the column direction. Thus, each of the windows of the input feature map 500 is two-dimensional array data of the 3×3 element size that is the same as the size of the sliding window.

Hereinafter, embodiments of FIGS. 6 and 7 may relate to windows determined in response to the input feature map 500 and the sliding window 510 of FIG. 5. The sliding window 510 may move the input feature map 500 in the column direction by one element interval and determine windows belonging to the same row. Further, the sliding window 510 may move in the row direction by one element interval and determine windows belonging to a next row. In this manner, 5×4=20 windows may be determined from the input feature map 500.

Figure 6:
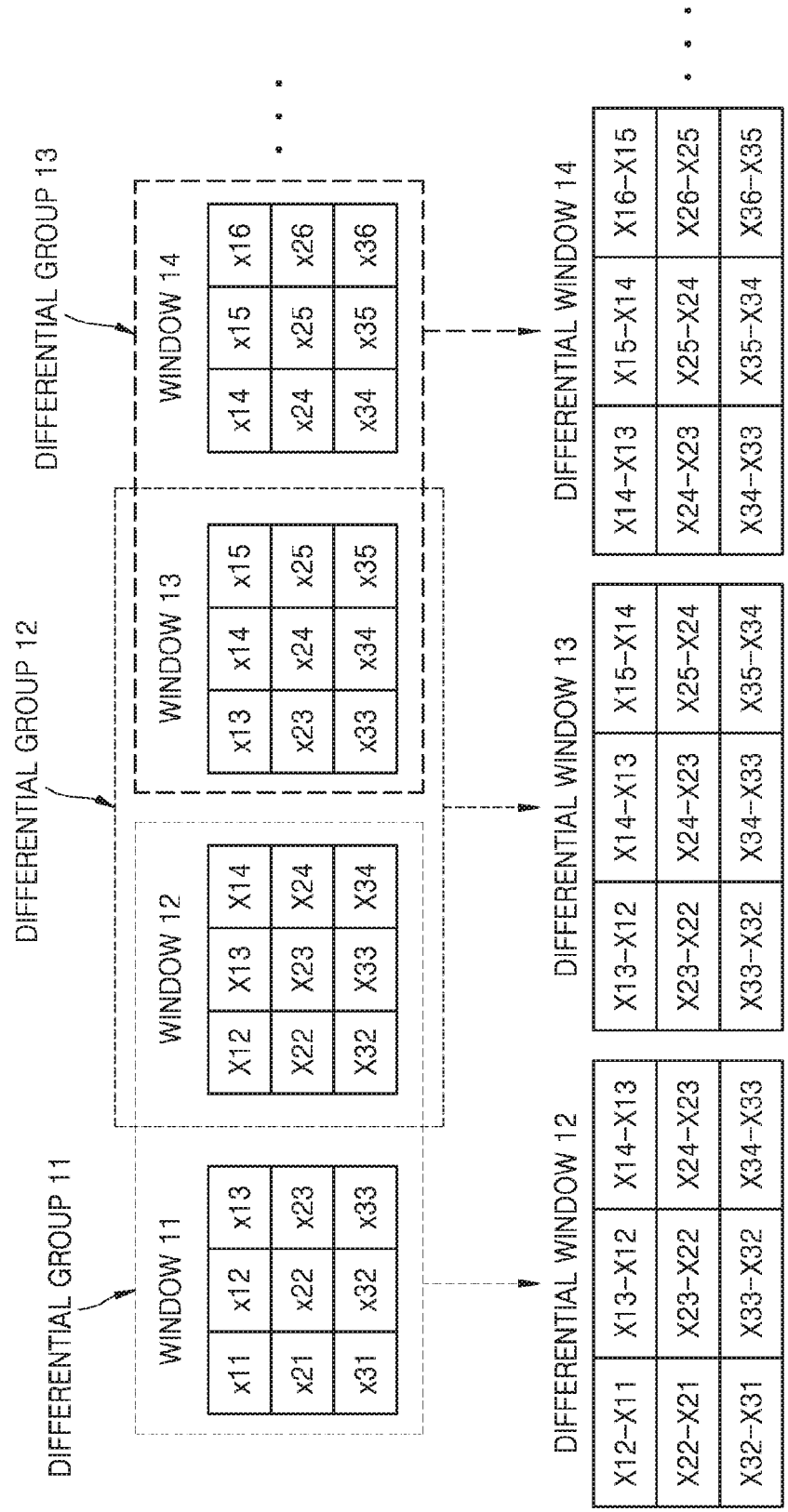
FIG. 6 illustrates a differential group and a differential window according to one or more embodiments.

FIG. 6 illustrates a differential group and a differential window according to one or more embodiments.

FIG. 6 shows four windows window 11, window 12, window 13 and window 14 belonging to the same row and three differential groups differential group 11, differential group 12, and differential group 13 including two adjacent windows among the four windows.

According to a column direction in which the sliding window 510 shown in FIG. 5 slides, the window 11 and the window 12, the window 12 and the window 13, and the window 13 and the window 14 may respectively be mutually adjacent windows and constitute different differential groups.

A window preceding in a differential direction among the differential groups may be a differential reference window, and a window following may be a differential subject window. A differential window may be generated by differentiating the differential reference window from the differential subject window.

For example, in the differential group 12, the differential window 13 may be generated by differentiating the preceding window 12 from the following window 13.

A differential operation between the windows may be performed in an element unit. For example, the differential window 13 may be generated through the differential operation between elements at the corresponding positions of the windows 13 and 12. For example, an element of the second row and the second column of the differential window 13 may be X24-X23 obtained by differentiating an element X23 of the window 12 from an element X24 of the second row and the second column of the window 13 that is a position corresponding thereto.

With respect to the corresponding relationships between the raw windows, the differential groups and the differential windows, each of following raw windows that is the differential subject window of each of the differential groups may correspond to each of the differential windows. For example, the raw window 12, which is a differential subject window of the differential group 11 may correspond to the differential window 12, and the raw window 13 of the differential group 12 may correspond to the differential window 13. Also, as a result of a convolution operation between each of the differential windows and a kernel, different elements of an output feature map may be generated. Thus, elements of the differential subject window that is the raw window, the differential window, and the output feature map may have corresponding relationships.

In FIG. 6, a differential window corresponding to the window 11, which is the raw window, is not shown. This is because the window 11, which is a reference window, may perform a convolution operation between the window 11 itself and the kernel without using a separate differential window to obtain a reference element of the corresponding output feature map. Therefore, in grouping the differential groups, a differential group including the window 11, which is the reference window as the differential subject window, may not be used.

Figure 7:
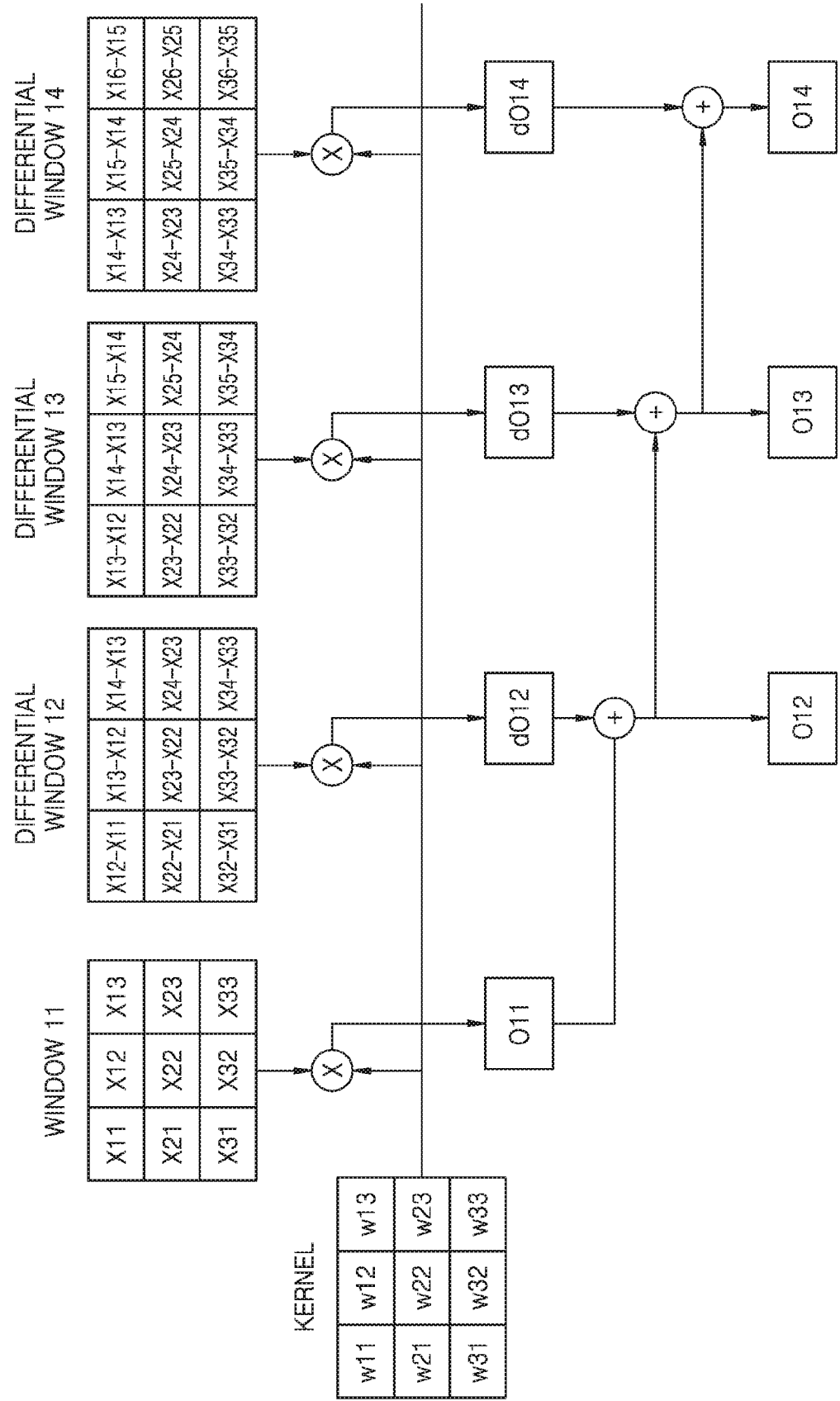
FIG. 7 illustrates a cascading summation operation according to one or more embodiments.

FIG. 7 illustrates a cascading summation operation according to one or more embodiments.

In FIG. 7, a kernel may be two-dimensional array data of weights having a 3×3 element size. The kernel may perform a convolution operation with each of the window 11, the differential window 12, the differential window 13, and the differential window 14.

O11, O12, O13 and O14 representing elements of an output feature map may represent different elements of the output feature map and correspond to the window 11, the differential window 12, the differential window 13, and the differential window 14, respectively. Since a differential subject window that is a raw window and a differential window have corresponding relationships, as described above with reference to FIG. 6, the elements O11, O12, O13 and O14 of the output feature map may correspond to the windows 11, 12, 13 and 14 respectively.

Referring to FIG. 7, the reference element O11 of the output feature map corresponding to the window 11 may be calculated directly from a convolution result between the window 11 and the kernel. Unlike this, the remaining elements O12, O13 and O14 of the output feature map may be calculated by cascading summing convolution results between the reference element O11 of the output feature map and the differential windows and the kernel. For example, the element O13 of the output feature map corresponding to the differential window 13 may be calculated by calculating a summation result between the reference element O11 and a convolution operation result dO12 between the differential window 12 and the kernel, and cascading summing the summation result and a convolution operation result dO13 between the differential window 13 and the kernel. For example, element O13 may be calculated by summing O11, dO12, and dO13.

Figure 8:
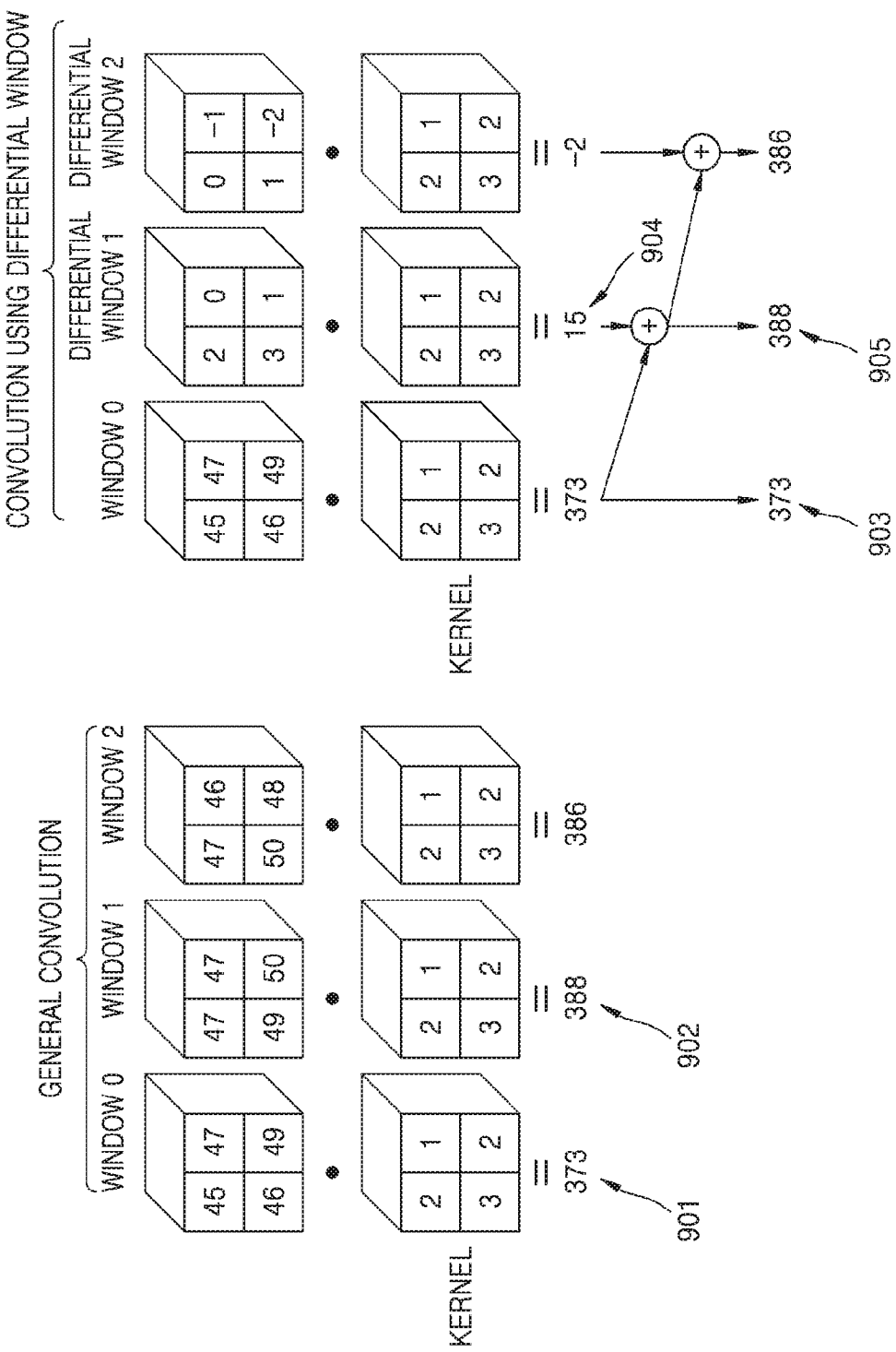
FIG. 8 illustrates a convolution operation using a differential window according to one or more embodiments.

FIG. 8 illustrates a convolution operation using a differential window according to one or more embodiments.

A window 0, a window 1, and a window 2 may represent raw windows. The differential window 1 may represent a differential window of the window 1 obtained by differentiating the window 1 from the window 1. The differential window 1 may represent a differential window of the window 1 obtained by differentiating the window 0 from the window 1, and the differential window 2 may represent a differential window of the window 2 obtained by differentiating the window 1 from the window 2.

In FIG. 8, the window 0, the window 1, and the window 2 that are raw windows, the differential window 1 and the differential window 2 that are differential windows, and a kernel are each two-dimensional array data having a 2×2 element size, though dimensions and element sizes are not limited thereto.

In a typical convolution operation process, the convolution operation may be respectively performed between each of the raw windows and the kernel, and each of elements of an output feature map may thus be respectively calculated. For example, an element 388 (902) of the output feature map corresponding to the window 1 may be calculated by summing multiplication results 47×2, 47×1, 49×3, and 50×2 between elements 47, 47, 49, and 50 of the window 1 and each of elements 2, 1, 3, and 2 of the corresponding positions of the kernel.

In contrast to the typical convolution operation process, in a convolution method of one or more embodiments using the differential window, while an element 373 (903) of the output feature map corresponding to the window 0 may be calculated by directly performing the convolution operation between the window 0 (which is a reference window, among the raw windows) and the kernel, an element 388 (905) of the output feature map corresponding to the window 1 may be calculated by summing a convolution operation result 15 (904) between the differential window 1 and the kernel and a convolution operation result 373 (903) between the window 0 and the kernel. Moreover, an element 386 of the output feature map corresponding to the window 2 may be calculated by summing a convolution operation result −2 between the differential window 2 and the kernel and the element 388 (905) of the output feature map corresponding to the window 1.

For example, each of elements 2, 0, 3, and 1 of the differential window 1 may be calculated by differentiating each of elements 45, 47, 46, and 49 of the adjacent window 0 from elements 47, 47, 49, and 50 of the window 1. Also, a convolution operation result 15 (904) between the differential window 1 and the kernel may be calculated by summing multiplication results 2×2, 0×1, 3×3, and 1×2 between the elements 2, 0, 3, and 1 of the differential window 1 and the elements 2, 1, 3, 2 of the corresponding positions of the kernel. In a similar manner, each of elements 0, −1, 1, and −2 of the differential window 2 may be calculated by differentiating each of elements of the corresponding positions of the adjacent differential window 1 from elements of the differential window 2, and a convolution operation result −2 between the differential window 2 and the kernel may be calculated.

An element 388 (905) of the output feature map corresponding to the window 1 may be calculated by summing the element 373 (903) of the output feature map corresponding to the window 1 that is a reference window and the convolution operation result 15 (904) between the differential window 1 and the kernel. This is the same as the element 388 (902) of the output feature map corresponding to window 1 calculated using a typical direct convolution operation between window 1 and the kernel.

An element of the output feature map corresponding to the window 2 may be calculated as 386 that is a cascading summation result obtained by successively summing a result obtained by summing the element 373 (903) of the output feature map corresponding to the reference window 1 and the convolution operation result 15 (904) between the differential window 1 and the kernel and the convolution operation result −2 between the differential window 2 and the kernel.

Accordingly, as described above, the typical convolution operation process may produce elements of the output feature map by performing direct convolutions between the kernel and each raw window of the input feature map. In contrast to the typical convolution operation process, the convolution operation process of one or more embodiments may produce, for example, the same elements of the output feature map without performing direct convolutions between the kernel and each raw window of the input feature map. Instead, while the convolution operation process of one or more embodiments may perform a direct convolution between the kernel and a first raw window of the input feature map to generate a first element of the output feature map, the remaining elements of the output feature map may instead be generated by performing convolutions between the kernel and differential windows (respectively corresponding to the raw windows) and performing a cascading summation operation for each of the convolution results based on the generated first element. Due to the spatial similarity between adjacent elements of an input feature map, the size of the data included in a differential window is substantially less than the size of the data included in a raw window corresponding to the differential window. Accordingly, by performing convolution operations using the differential windows of smaller data size instead of performing direct convolution operations using the raw windows of larger data size as in the typical convolution operation process, devices implementing the convolution operation process of one or more embodiments may have a faster processing speed and may use less memory, with faster or less onloading and offloading of information with an external memory, than devices implementing the typical convolution operation process to generate the output feature map.

Figure 9:
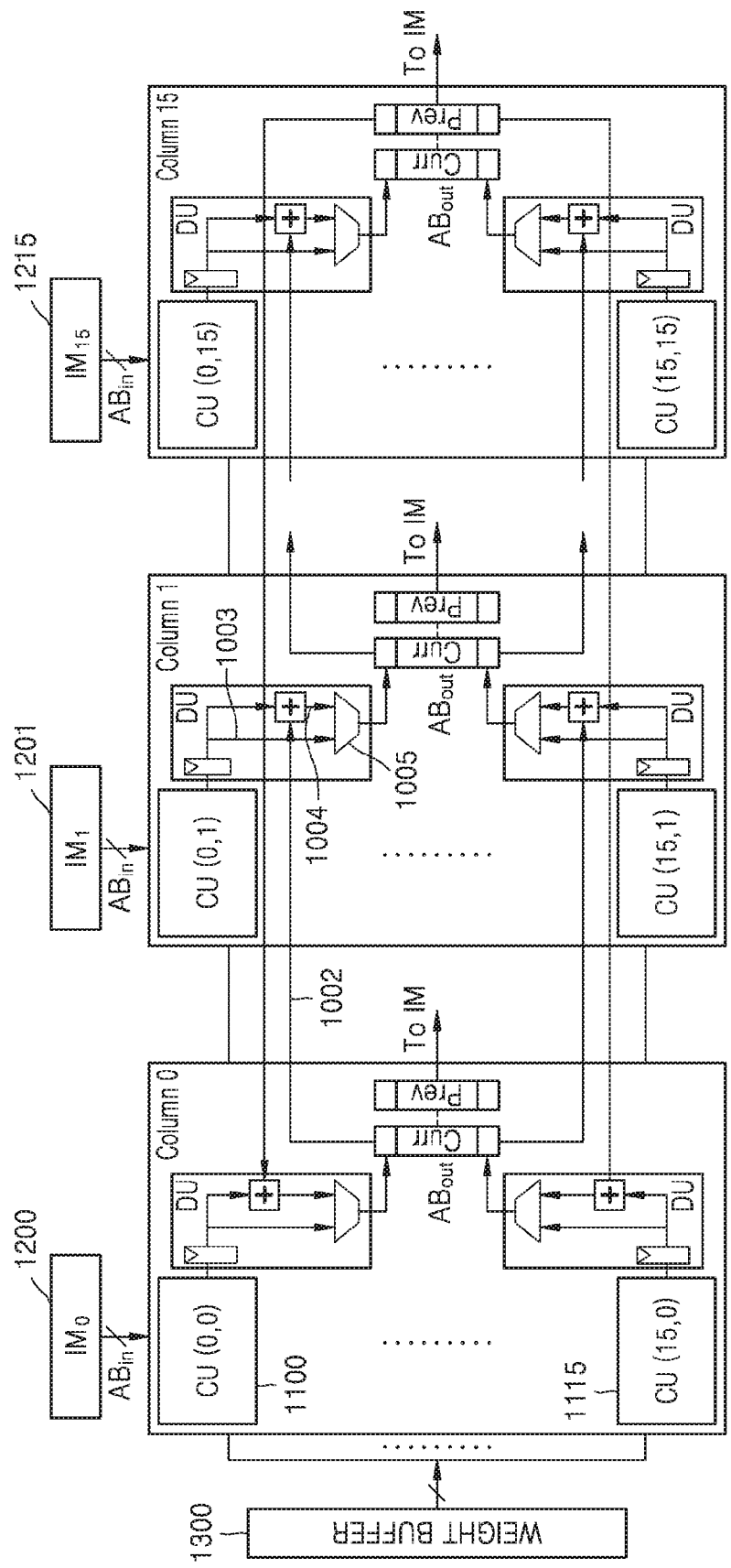
FIG. 9 illustrates a neural network processing device according to one or more embodiments.

FIG. 9 illustrates an example of a neural network processing device according to one or more embodiments.

In FIG. 9, the neural network processing device may include a plurality of input feature map memories 1200, 1201, and 1215 storing input feature maps, a weight memory buffer 1300 storing weights of a kernel, a plurality of convolution units (CUs) 1100 and 1115 for performing a convolution operation, and a plurality of differential reconstruction units (DUs) for performing a cascading summation operation to calculate an element of an output feature map from a convolution operation result using a differential window.

Each of the plurality of input feature map memories 1200, 1201, and 1215 may store different raw windows or differential windows.

Also, a predetermined number of CUs 1100 and 1115 may be grouped into one column. Each of different columns may correspond to each of different columns of the output feature map. For example, when a column size of the output feature map is 16, Column0, Column1, and Column15 may correspond to each of sixteen columns of the output feature map. However, Column0 to Column15 may receive input data ABin from each of IM0 1200 and IM1 1201 to IM15 1215 and may be grouped in various ways for processing data in parallel but are not limited to a grouping method according to the present embodiment. In FIG. 9, second indexes of an index of IM, an index of Column, and a bracket index of CU may be the same in order to represent corresponding relationships.

Each of columns may include sixteen CUs. Each of different CUs belonging to the same column may correspond to an input feature map and each of a plurality of channels of a kernel. For example, a CU (0,0) 1100 may process a first channel of a window input from the IM0 1200, and a CU (15,0) 1115 may process a 16th channel. Therefore, sixteen channels may be processed in parallel using the sixteen CUs belonging to the same column.

Each of the columns may include a buffer. For example, ABout that is an output feature map calculated from a window input into each of the columns may be stored in the buffer. An element of an output feature map calculated from a currently input raw window or a differential window may be stored in a corresponding buffer Curr. As an element of the output feature map is calculated from a next raw window or the differential window, the element stored in the buffer CUrr may move to and be stored in a buffer Prev. The element of the output feature map calculated from the next raw window or the differential window may be stored in the buffer Curr. The element of the output feature map stored in the buffer Prev and a convolution operation result between a differential window of another column and the kernel may be cascading summed. For example, the element of the output feature map stored in the buffer Prev of Column 15 and a convolution operation result between a differential window of Column 0 and the kernel may be summed such that an element of the output feature map corresponding to Column 0 may be calculated.

A convolution operation result calculated from each of a plurality of CUs may be input to the corresponding DU. When the convolution operation result calculated from the CU is a convolution operation result between a raw window and the kernel, the convolution operation result may be output through a multiplexer 1005. When the convolution operation result calculated from the CU is a convolution operation result between the differential window and the kernel, a result of summing with an element of the output feature map corresponding to another column may be output through the multiplexer. For example, when ABin input from the IM1 1201 is a raw window, a result 1003 input to a DU through CU (0, 1) may be directly output through the multiplexer 1005. When ABin input from the IM1 1201 is a differential window, a result 1004 obtained by cascading summing the convolution operation result 1003 input from CU (0,1) and an element 1002 of the output feature map stored in the buffer Curr of Column0 may be output through the multiplexer 1005. Also, elements of the output feature map calculated from a plurality of columns may be stored in the IM as input feature maps to a next layer of a current layer.

Figure 10:
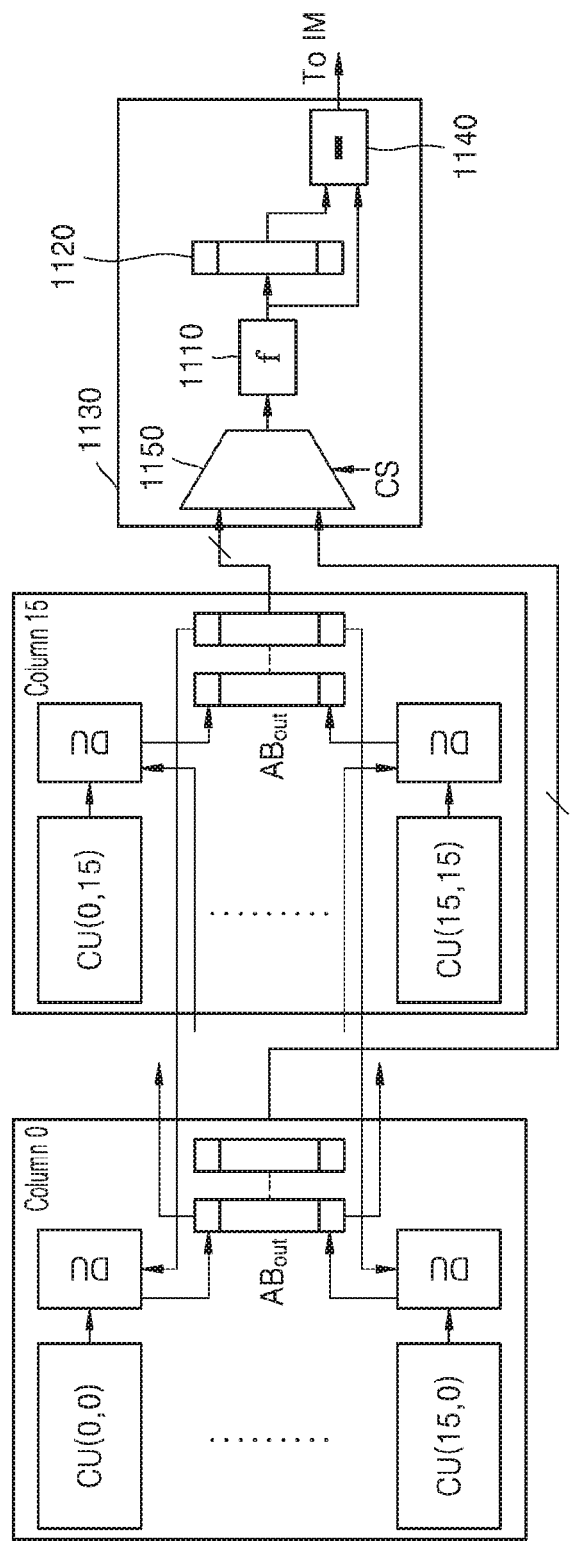
FIG. 10 illustrates a differential window output unit according to one or more embodiments.

FIG. 10 illustrates a differential window output unit (e.g., a differential window output unit 1130) according to one or more embodiments. FIG. 10 illustrates the differential window output unit 1130 added to the embodiment described with reference to FIG. 9, and the embodiment described above with reference to FIG. 9 may be applied to the embodiment of FIG. 10.

The differential window output unit 1130 may include a multiplexer 1150. For example, the multiplexer 1150 may output an element of an output feature map corresponding to a column designated by column select (CS) designating one of Column0 to Column16. At this time, the element selectively output from the multiplexer 1150 may be converted to an activation value through an activation converter 1110. The element of the output feature map output from the multiplexer 1150 may be stored in a buffer 1120. At this time, what? may be input to a differentiator 1140 for performing a differential operation between the element of the output feature map stored in the buffer 1120 and the element of the output feature map of the currently selected column. The differentiator 1140 may perform the differential operation between the input elements and store a difference operation result in an IM. Therefore, the efficiency of operation arithmetic processing may be increased by generating differential windows used in a next layer in a current layer without separately generating a differential window in the next layer.

Figure 11:
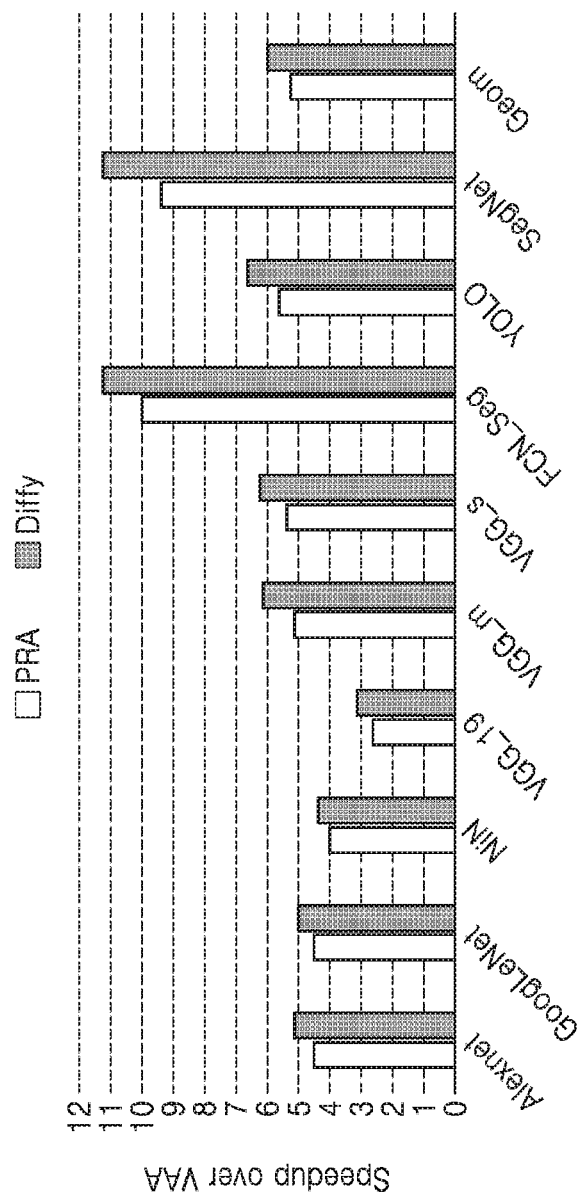
FIG. 11 illustrates an inference operation processing speed of an operation of example hardware accelerator that performs Differential Convolution (Diffy) implementations over a Bit-Pragmatic accelerator (PRA) and a value-agnostic accelerator (VAA)

FIG. 11 illustrates an inference operation processing speed of an operation of example hardware accelerator that performs Differential Convolution (Diffy) implementations over a Bit-Pragmatic accelerator (PRA) and a value-agnostic accelerator (VAA).

In FIG. 11, the horizontal axis may represent neural network models to which a typical neural network operation processing PRA and the differential convolutional operation processing method (Diffy) according to one or more embodiments are applied, and the vertical axis may represent a speed increase degree compared to a typical method VAA that is a comparison reference of the enhancement of speed. Referring to the graph, for certain neural network models, the speed of Diffy is improved about 6.1 times or more compared to the typical VAA and is improved about 1.16 or more compared to the PRA. Also, the operation processing speed of Diffy, which is implemented according to the present disclosure in all neural network models of FIG. 11, is improved compared to the method PRA.

Figure 12:
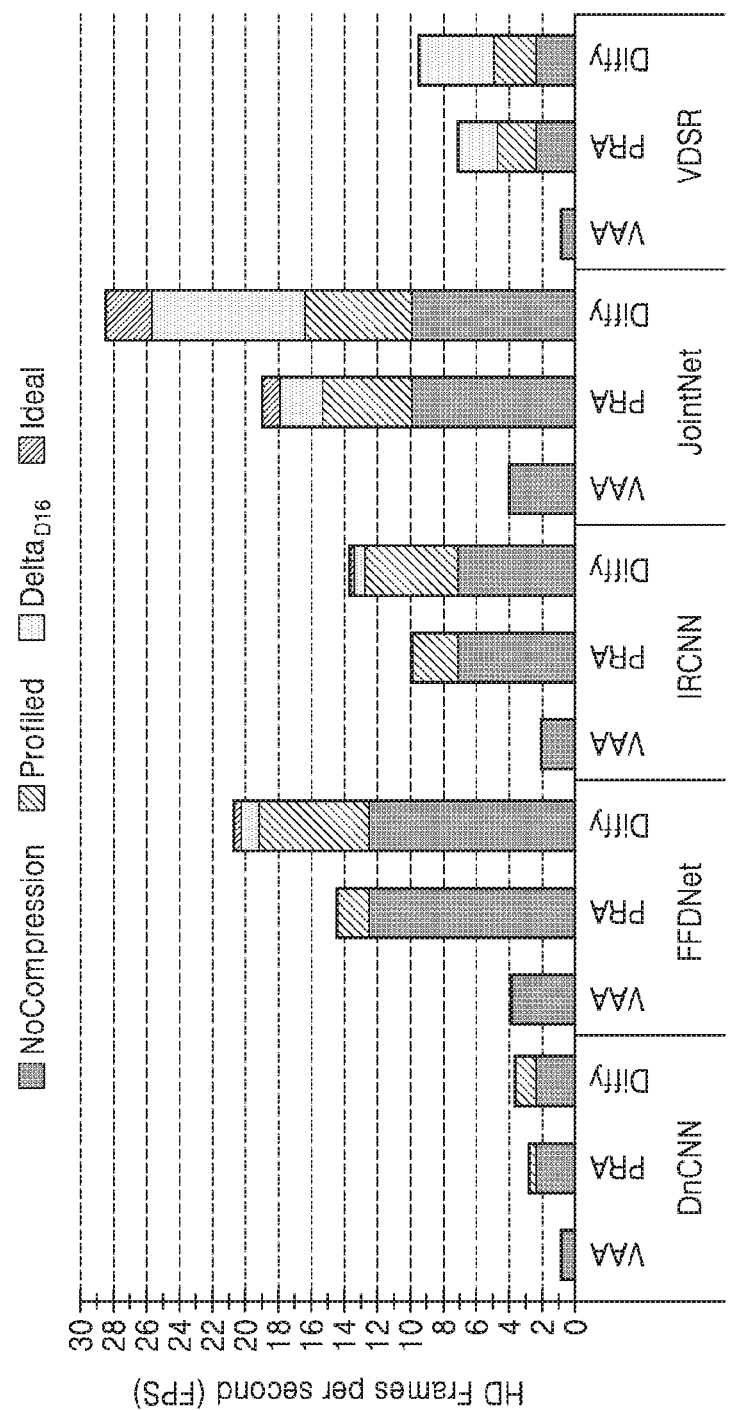
FIG. 12 illustrates a frame rate of an arithmetic processing implementation of VAA, PRA, and example Diffy implementations with different compression schemes.

FIG. 12 illustrates a frame rate of an arithmetic processing implementation of VAA, PRA, and example Diffy implementations with different compression schemes.

In FIG. 12, the graph shows comparison of HD frame per second (FPS) indicating the frame rate of the operation processing methods VAA and PRA and the differential convolutional operation processing method (Diffy) in each of neural network models DnCNN, FFDNet, IRCNN, Joint-Net, VDSR, and Geom. As shown in the graph, Diffy greatly increases the FPS compared to the methods. Also, in the model JointNet, Diffy shows a performance close to 30 FPS. This indicates that Diffy is more suitable for image-related applications operating in a terminal such as a smart phone compared to the typical operation processing methods.

Diffy is a DC-based architecture that improves the performance and energy efficiency of a computational Imaging deep neural network (CI-DNN) and other convolution neural networks (CNNs). For example, Diffy may improve the efficiency of a CI-DNN that performs denoising, demosaicking, sharpening, deblurring, and/or super-resolution imaging of an image using an output feature map generated as described above. By using a differential value, Diffy may reduce the required storage capacity of on-chip and off-chip memory and reduce traffic. Also, as applied to the most advanced CI-DNN, Diffy may perform 1K 16×16b multiplication accumulation operations per period, which may improve performance 7.1 and 1.41 times compared to VAA and PRA, respectively. Diffy may process HD frames from 3.9 to 28.5 FPS according to a target application. This is a significant improvement compared to 0.7 to 3.9 FPS of VAA and 2.6 to 18.9 FPS of PRA. Diffy may reduce the storage space of the on-chip memory by 32% and off-chip traffic by 1.43× when compared to a method of dynamically determining the precision per group for a raw value.

Figure 13:
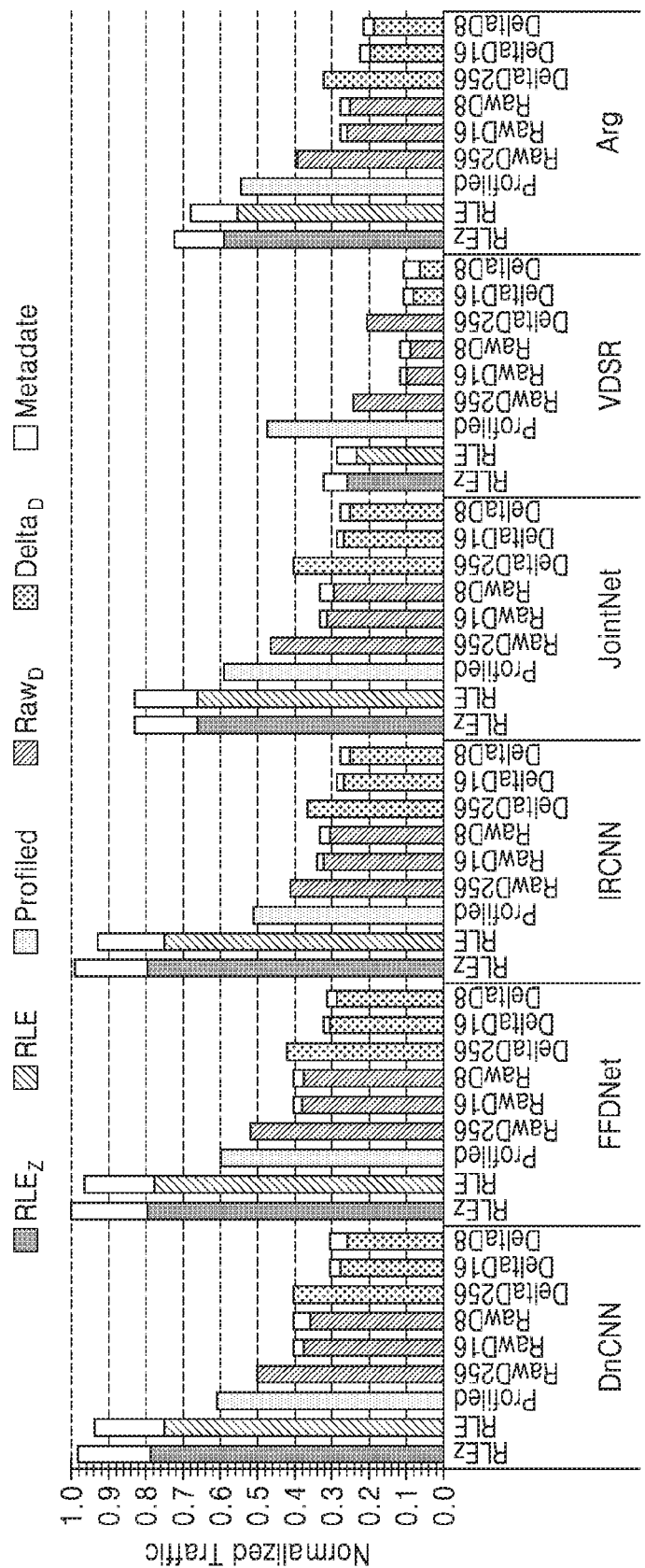
FIG. 13 illustrates a compression scheme of off-chip traffic normalized to no compression.

FIG. 13 illustrates a compression scheme of off-chip traffic normalized to no compression.

FIG. 13 shows off-chip traffic normalized to NoCompression. Taking the metadata into account, the benefit of the RLEz and RLE schemes is significant only for VDSR due to its high activation sparsity. These schemes prove ineffective for CI-DNNs while they were shown to be effective for classification models [30]. Profiled reduces off-chip traffic to about 54%. Using dynamic per group precisions reduces off-chip traffic further to 39% with a group of 256 (RawD256) and to about 28% with the smaller group sizes of 16 (RawD16) or 8 (RawD8)—the overhead due to the metadata increases as the group size decreases. Storing activations as deltas with per group precision (DeltaD16) further reduces off-chip traffic resulting to just 22% of the uncompressed traffic, an improvement of 27% over RawD16. Since off-chip accesses are two orders of magnitude more expensive than on-chip accesses, this reduction in off-chip traffic should greatly improve overall energy efficiency. While using a group size of 16 (DeltaD16) reduces traffic considerably compared to using a group size of 256 (DeltaD256) the metadata overhead prevents further reduction with the smaller group size (DeltaD8). In the rest of the evaluation we restrict attention to DeltaD16 for on-chip and off-chip encoding of imaps/omaps.

The neural network processing devices, neural network processing device 300, processors, neural network processor 310, memories, memory 320, convolution units (CUs) 1100 and 1115, input feature map memories 1200, 1201, and 1215, buffers, buffer 1120, weight memory buffer 1300, multiplexers, multiplexer 1005, multiplexer 1150, differential reconstruction units (DUs), differential window output units, converters, converter 1110, differential window output unit 1130, differentiators, differentiator 1140, and other apparatuses, units, modules, devices, and other components described herein with respect to FIGS. 1-13 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-13 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions used herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented method implementing a convolution neural network, the method comprising:
generating a plurality of differential groups by grouping a plurality of raw windows of an input feature map into the plurality of differential groups, the plurality of raw windows are sub-feature maps of the input feature map;
generating differential windows by performing, for each respective differential group of the differential groups, a differential operation between raw windows of the respective differential group, the differential operation being an element-wise differential operation between two raw windows of each respective differential group;
determining a reference element of an output feature map corresponding to a reference raw window among the raw windows by performing a convolution operation between a kernel and the reference raw window; and
determining remaining elements of the output feature map by performing a reference element summation operation based on the reference element and each of a plurality of convolution operation results determined by performing respective convolution operations between the kernel and each of the differential windows.

2. The method of claim 1,
wherein the raw windows are determined from the input feature map according to a sliding window fashion,
wherein the grouping of the raw windows into the differential groups comprises grouping, for each respective differential group, two of the raw windows into the respective differential group, and
wherein the two of the raw windows are adjacent in a stride direction of to the sliding window fashion.

3. The method of claim 2, wherein the element-wise differential operation is being performed between the two adjacent raw windows of the respective differential group.

4. The method of claim 2, wherein the performing of the summation operation comprises performing the summation operation between the reference element and each of a plurality of cascading summation results determined by performing a cascading summation operation on each of the convolution operation results.

5. The method of claim 4, wherein
the performing of the cascading summation operation on one of the convolution operation results comprises summing the one of the convolution operation results and other ones of the convolution operation results,
wherein the other ones of the convolution operation results correspond to one or more differential windows preceding, in the sliding direction, a differential window corresponding to the one of the convolution operation results.

6. The method of claim 1, further comprising:
in response to each of the differential windows being a bit data format, converting each of the differential windows into a data format comprising information about a significant bit digit representing a bit value of 1,
wherein the convolution operation results between the kernel and each of the differential windows are convolution operation results between the kernel and each of the differential windows converted into the data format.

7. The method of claim 6, wherein the convolution operation results between the kernel and each of the differential windows converted into the data format are results calculated according to a bit-shift operation result based on the information about the significant bit digit.

8. The method of claim 7, further comprising preprocessing the differential windows according to a booth algorithm that reduces significant bit digits, as pre-processing for converting the data format.

9. The method of claim 1, further comprising:
performing, using the convolution neural network, any one or any combination of any two or more of denoising, demosaicking, sharpening, deblurring, and super-resolution imaging of an image based on the output feature map,
wherein the convolution neural network is a computational imaging deep neural network (CI-DNN).

10. A non-transitory computer-readable storage medium storing instructions that, when executed by one or more processors, cause the one or more processors to perform the method of claim 1.

11. The method of claim 1, wherein each respective differential group includes a first raw window and a second raw window of the input feature map,
wherein the differential operation performed based on an element-wise difference between the first raw window and the second raw window of each respective differential group.

12. A neural network processing device comprising:
one or more neural network processors configured to:
generate a plurality of differential groups by grouping a plurality of raw windows of an input feature map into the plurality of differential groups, the plurality of raw windows are sub-feature maps of the input feature map;
generate differential windows by performing, for each respective differential group, a differential operation between raw windows of the respective differential group, the differential operation being an element-wise differential operation between two raw windows of each respective differential group;

determine a reference element of an output feature map corresponding to a reference raw window among the raw windows by performing a convolution operation between a kernel and the reference raw window; and determine remaining elements of the output feature map by performing a reference element summation operation based on the reference element and each of a plurality of convolution operation results determined by performing a convolution operation between the kernel and each of the differential windows.

13. The device of claim 12, wherein the raw windows are determined from the input feature map according to a sliding window fashion, wherein the grouping of the raw windows into the differential groups comprises grouping, for each respective differential group, two of the raw windows into the respective differential group, and wherein the two of the raw windows are adjacent in a stride direction of to the sliding window fashion.

14. The device of claim 13, wherein, the element-wise differential operation is being performed between the two adjacent raw windows of the respective differential group.

15. The device of claim 13, wherein, for the performing of the summation operation, the one or more processors are further configured to perform the summation operation between the reference element and each of a plurality of cascading summation results determined by performing a cascading summation operation on each of the convolution operation results.

16. The device of claim 15, wherein the performing of the cascading summation operation on one of the convolution operation results comprises summing the one of the convolution operation results and other ones of the convolution operation results, wherein the other ones of the convolution operation results correspond to one or more differential windows preceding, in the sliding direction, a differential window corresponding to the one of the convolution operation results.

17. The device of claim 12, wherein the one or more processors are further configured to convert, in response to each of the differential windows being a bit data format, each of the differential windows into a data format comprising information about a significant bit digit representing a bit value of 1, wherein the convolution operation results between the kernel and each of the differential windows are convolution operation results between the kernel and each of the differential windows converted into the data format.

18. The device of claim 17, wherein the convolution operation results between the kernel and each of the differential windows converted into the data format are results calculated according to a bit-shift operation result based on the information about the significant bit digit.

19. The device of claim 18, wherein the one or more processors are further configured to preprocess the differential windows according to a booth algorithm that reduces significant bit digits, as pre-processing for converting the data format.

20. The device of claim 12, wherein each respective differential group includes a first raw window and a second raw window of the input feature map, wherein the differential operation performed based on an element-wise difference between the first raw window and the second raw window of each respective differential group.

21. A processor-implemented method implementing a convolution neural network, the method comprising:

determining a first raw window and a second raw window of an input feature map, each respectively comprising an array of features of the input feature map, the first raw window and the second raw window are sub-feature maps of the input feature map;

generating a differential window performing element-wise differential operation between the first and the second raw window; and determining elements of an output feature map based on a convolution operation between a kernel and the first raw window and a convolution operation between the kernel and the differential window.

22. The method of claim 21, wherein the determining of the elements of the output feature map comprises:

determining a first element of the output feature map as a result of the convolution operation between the kernel and the first raw window; and determining a second element of the output feature map as a result of a summation of the first element and a result of the convolution operation between the kernel and the differential window.

* * * * *